United States Patent
Das et al.

(10) Patent No.: US 12,488,687 B2
(45) Date of Patent: Dec. 2, 2025

(54) FILTERING V2X SENSOR DATA MESSAGES

(71) Applicant: QUALCOMM Incorporated, San Diego, CA (US)

(72) Inventors: Soumya Das, San Diego, CA (US); Mohammad Nekoui, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 314 days.

(21) Appl. No.: 17/879,887

(22) Filed: Aug. 3, 2022

(65) Prior Publication Data
US 2024/0046791 A1 Feb. 8, 2024

(51) Int. Cl.
G08G 1/16 (2006.01)
H04W 4/46 (2018.01)

(52) U.S. Cl.
CPC .............. G08G 1/16 (2013.01); H04W 4/46 (2018.02)

(58) Field of Classification Search
CPC ...... G08G 1/16; G08G 1/0133; G08G 1/0145; G08G 1/166; G08G 1/012; H04W 4/46; H04W 4/38; H04L 67/12
See application file for complete search history.

(56) References Cited

U.S. PATENT DOCUMENTS

| | | | |
|---|---|---|---|
| 9,424,749 B1 | 8/2016 | Reed et al. | |
| 9,531,737 B2 | 12/2016 | Stählin | |
| 10,755,565 B2 | 8/2020 | Zhang et al. | |
| 10,872,379 B1 | 12/2020 | Nepomuceno et al. | |
| 11,981,326 B2 | 5/2024 | Rahimpour et al. | |
| 2006/0161913 A1 | 7/2006 | Barrs et al. | |
| 2008/0074246 A1 | 3/2008 | Isaji et al. | |
| 2008/0252482 A1 | 10/2008 | Stopczynski | |
| 2010/0211273 A1 | 8/2010 | Köllner et al. | |

(Continued)

FOREIGN PATENT DOCUMENTS

| | | |
|---|---|---|
| EP | 2307980 B1 | 8/2016 |
| EP | 1471481 B1 | 10/2019 |

(Continued)

OTHER PUBLICATIONS

ETSI Secretariat: "LS on SAE Sensor Sharing Service (J3224) and Maneuver Sharing and Coordinating Service (J3186) Standards Development", ETSI Draft, ITSWG1(22)060021, European Telecommunications Standards Institute, 650, Route Des Lucioles, F-06921 Sophia-Antipolis, France, vol. WG ITS WG1 Application Requirements and Services, Jun. 27, 2022, XP014432961, pp. 1-81, pp. 32, 49, pp. 9-19.

(Continued)

Primary Examiner — Omeed Alizada
(74) Attorney, Agent, or Firm — SUNSTEIN LLP

(57) ABSTRACT

Techniques are provided for filtering object detection information provided via V2X communication links. An example method for partially filtering a sensor data sharing message includes receiving the sensor data sharing message from a vehicle, decoding a first portion of the sensor data sharing message to determine an area of interest associated with the vehicle, determine a relative position of the area of interest, and decoding or discarding a second portion of the sensor data sharing message based on the relative position of the area of interest.

20 Claims, 20 Drawing Sheets

(56) References Cited

U.S. PATENT DOCUMENTS

| | | |
|---|---|---|
| 2011/0251755 A1 | 10/2011 | Widmann |
| 2013/0034346 A1 | 2/2013 | Ishikawa |
| 2013/0226406 A1 | 8/2013 | Ueda et al. |
| 2014/0195138 A1 | 7/2014 | Stelzig et al. |
| 2014/0278035 A1 | 9/2014 | Nortrup |
| 2015/0016681 A1 | 1/2015 | Fukata et al. |
| 2015/0019064 A1 | 1/2015 | Shin |
| 2016/0355181 A1 | 12/2016 | Morales Teraoka et al. |
| 2017/0021760 A1 | 1/2017 | Calnek |
| 2017/0363720 A1 | 12/2017 | Moriuchi |
| 2018/0004211 A1 | 1/2018 | Grimm et al. |
| 2018/0053404 A1 | 2/2018 | Horita et al. |
| 2018/0075309 A1 | 3/2018 | Sathyanarayana et al. |
| 2018/0082493 A1* | 3/2018 | Patil ............... H04W 72/02 |
| 2018/0086219 A1 | 3/2018 | Malek et al. |
| 2018/0196443 A1 | 7/2018 | Bai et al. |
| 2018/0225965 A1 | 8/2018 | Macneille et al. |
| 2018/0257660 A1* | 9/2018 | Ibrahim ............. G01S 5/0027 |
| 2018/0285658 A1 | 10/2018 | Günther et al. |
| 2018/0288320 A1 | 10/2018 | Melick et al. |
| 2018/0365909 A1* | 12/2018 | Cheng ................ H04W 4/40 |
| 2019/0035277 A1 | 1/2019 | Son et al. |
| 2019/0043357 A1* | 2/2019 | Stinnett ........... G08G 1/096791 |
| 2019/0045244 A1 | 2/2019 | Balakrishnan et al. |
| 2019/0087049 A1 | 3/2019 | Mani et al. |
| 2019/0120964 A1 | 4/2019 | Luo et al. |
| 2019/0180616 A1 | 6/2019 | Masuike et al. |
| 2019/0378414 A1 | 12/2019 | Pari et al. |
| 2020/0026289 A1 | 1/2020 | Alvarez et al. |
| 2020/0072963 A1 | 3/2020 | Yu et al. |
| 2020/0192351 A1 | 6/2020 | Rastoll et al. |
| 2020/0209364 A1 | 7/2020 | Sunil Kumar et al. |
| 2021/0009122 A1 | 1/2021 | Nath et al. |
| 2021/0020073 A1 | 1/2021 | Asmari et al. |
| 2021/0056770 A1 | 2/2021 | Moradi Pari |
| 2021/0082210 A1 | 3/2021 | Sakr |
| 2021/0086755 A1 | 3/2021 | Moshchuk et al. |
| 2021/0133886 A1 | 5/2021 | Williams et al. |
| 2021/0146896 A1 | 5/2021 | Bush et al. |
| 2021/0213955 A1 | 7/2021 | Zhao et al. |
| 2021/0216775 A1 | 7/2021 | Bauchot et al. |
| 2021/0256321 A1 | 8/2021 | Gerardo Castro et al. |
| 2021/0304595 A1 | 9/2021 | Ahire et al. |
| 2021/0311183 A1 | 10/2021 | Marsh et al. |
| 2021/0382489 A1 | 12/2021 | Goyal et al. |
| 2022/0028257 A1 | 1/2022 | Lindberg Nilsson et al. |
| 2022/0046381 A1 | 2/2022 | Ong et al. |
| 2022/0084405 A1 | 3/2022 | Zhang et al. |
| 2022/0185288 A1 | 6/2022 | Boydston |
| 2022/0198351 A1* | 6/2022 | Beaurepaire ............ G06N 3/08 |
| 2022/0219690 A1 | 7/2022 | Lee |
| 2022/0254249 A1 | 8/2022 | Tel-Or et al. |
| 2022/0300743 A1 | 9/2022 | Imran et al. |
| 2022/0309521 A1 | 9/2022 | Stenneth et al. |
| 2022/0319327 A1 | 10/2022 | Nakamura |
| 2022/0351553 A1 | 11/2022 | Heiser et al. |
| 2024/0046783 A1 | 2/2024 | Das et al. |

FOREIGN PATENT DOCUMENTS

| | | |
|---|---|---|
| JP | 2005346333 A | 12/2005 |
| WO | 2021167393 A1 | 8/2021 |
| WO | 2022040284 | 2/2022 |
| WO | 2023019502 | 2/2023 |

OTHER PUBLICATIONS

International Search Report and Written Opinion—PCT/US2023/028012—ISA/EPO—Oct. 30, 2023.

* cited by examiner

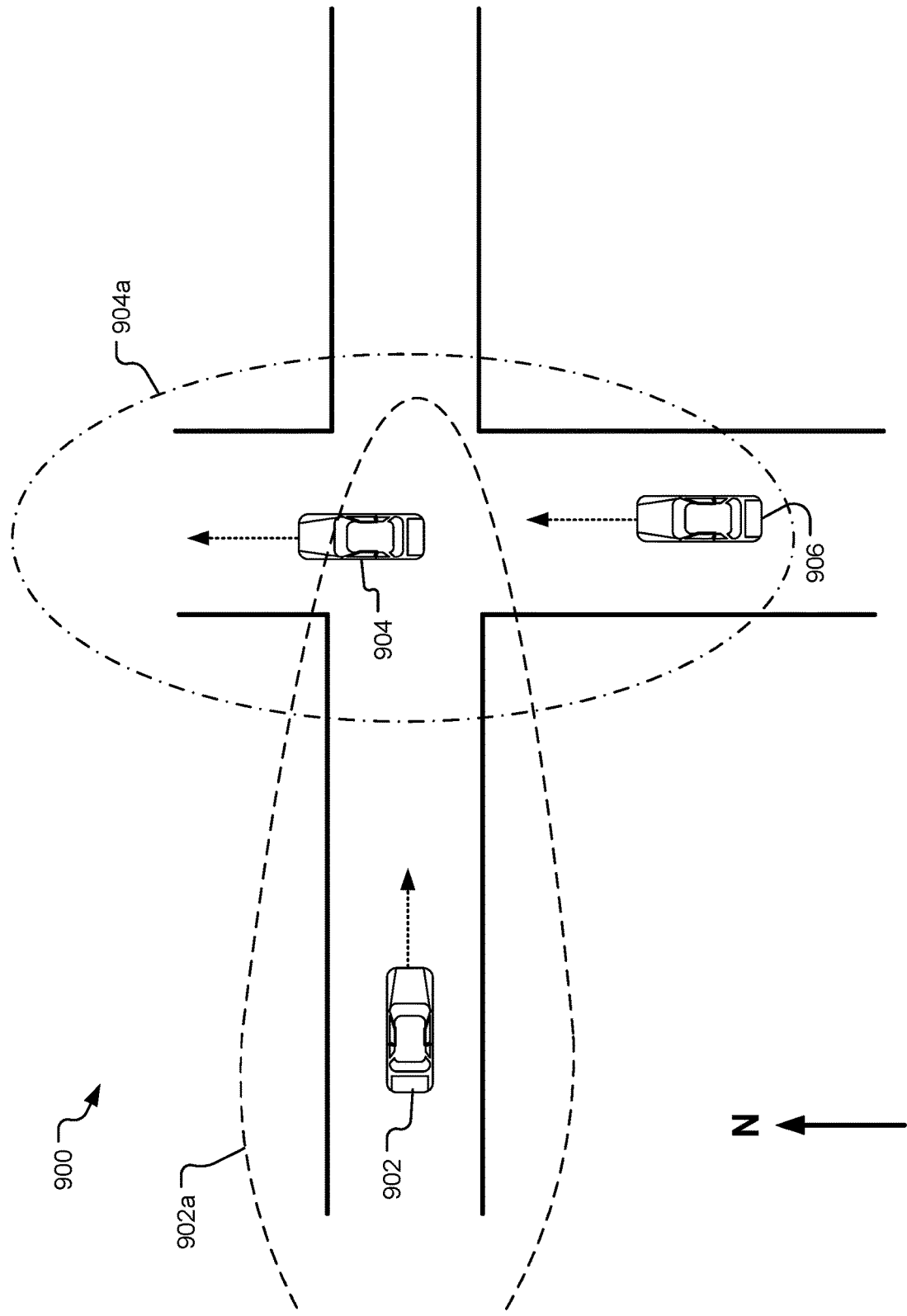

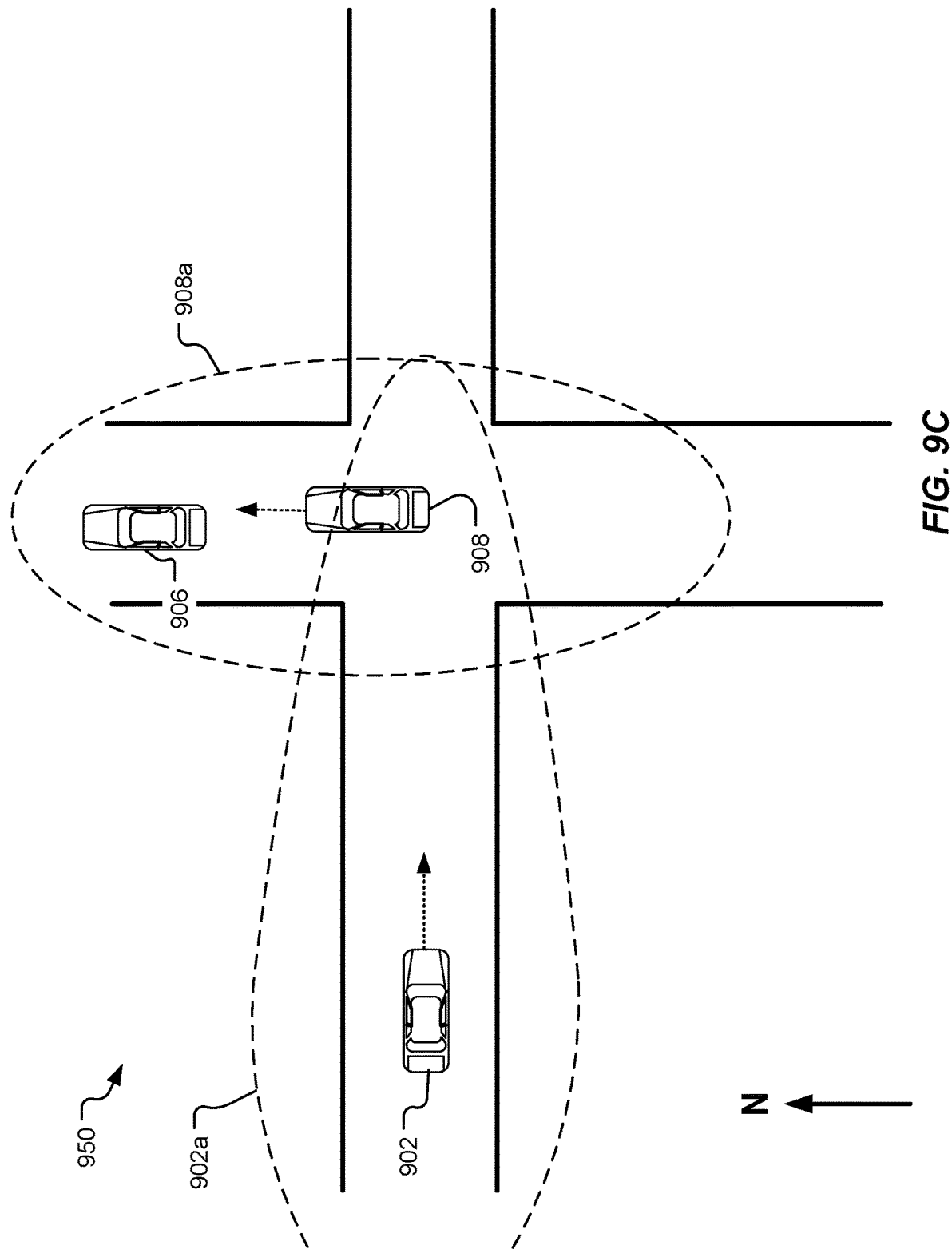

```
SensorSharingMsg ::= SEQUENCE {
  msgCnt              MsgCount, -- Sequence number
  sourceVehicleID     TemporaryID -- temporary vehicle ID/RSU ID. SDSM source.
  equipmentType       EquipmentType -- Sender type
  sDSMTimestamp       SDSMTimestamp -- SDSM transmission time
  refPos              Position3D, -- Sender reference position
  refPosXYConf        PositionalAccuracy
  refPosElConf        ElevationConfidence OPTIONAL vehHeading          VehicleHeadingAngle                    ⎤ 1302
  headingConfidence   HeadingConfidence                      ⎦ objects             DetectedObjectList, -- detected objects        1006 objMaxPosOffset     DetectedObjMaxPosOffset -- max offset of all detected object objGroupEndIndex            objGroupEndIndexList -- e.g. [5,10,30] for 30 total detected objects    ⎤
  objMaxPosOffsetInGroup      objMaxPosOffsetInGroupList -- max position offset per group             ⎥ 1304
  objMinHeadingInGroup        objMinHeadingInGroupList -- closest obj heading to zero deg            ⎥
  objMaxHeadingInGroup        objMaxHeadingInGroupList -- closest obj heading to 180 deg             ⎦
  ...
}
```

FIG. 13

FILTERING V2X SENSOR DATA MESSAGES

BACKGROUND

The following relates generally to wireless communications, and more specifically to filtering sensor data sharing messages (SDSM) and/or collective perception messages (CPM) transmitted via vehicle-to-everything (V2X) communication links.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In some wireless communications systems, such as distributed wireless networks, wireless devices (e.g., UEs) may directly communicate with each other (e.g., via sidelink communications) and may support various radio frequency and/or baseband capabilities. In some cases, direct communications between wireless devices may include direct communications between vehicles and systems that use such communications may sometimes be referred to as vehicle-to-everything (V2X) communication systems. V2X communication links may be configured to convey important information between vehicles regarding object and vehicle detection, road conditions, and/or the activities of nearby vehicles, for example. V2X communication systems may also be used by autonomous or semi-autonomous vehicles (e.g., self-driving vehicles or vehicles that provide driver assistance) and may provide extra information beyond the reach of the vehicle's existing system. Such V2X communication links may provide certain safety-related information (e.g., location, direction of travel, velocity, object detection, etc.) in unencrypted messages so that other vehicles may receive such information. As the number of V2X vehicles increase, there is a need to improve processes for handling the associated increase in V2X related messaging.

SUMMARY

An example method for providing detected object data according to the disclosure includes detecting one or more objects proximate to a vehicle, organizing information associated with the one or more detected objects proximate to the vehicle into one or more data groups, generating a sensor data sharing message including host data and detected object data based on the information associated with the one or more detected objects proximate to the vehicle, wherein the detected object data is organized based on the one or more data groups and the host data includes indexing information associated with the one or more data groups, and transmitting the sensor data sharing message.

An example method for filtering detected object data according to the disclosure includes receiving a sensor data sharing message associated with a first vehicle including host data and detected object data, wherein the detected object data is organized into one or more data groups and the host data includes indexing information associated with the one or more data groups, determining an operating context for a second vehicle, and filtering the one or more of data groups based at least in part on the operating context for the second vehicle and the indexing information associated with the one or more data groups.

An example method for filtering detected object data according to the disclosure includes receiving a basic safety message and one or more sensor data sharing messages from a vehicle, determining a relevance of the basic safety message based at least in part on a location of the vehicle, and decoding or discarding the one or more sensor data sharing messages based on the relevance of the basic safety message.

An example method for partially filtering a sensor data sharing message according to the disclosure includes receiving the sensor data sharing message from a vehicle, decoding a first portion of the sensor data sharing message to determine an area of interest associated with the vehicle, determine a relative position of the area of interest, and decoding or discarding a second portion of the sensor data sharing message based on the relative position of the area of interest.

Items and/or techniques described herein may provide one or more of the following capabilities, as well as other capabilities not mentioned. Manned and autonomous vehicles may be equipped with various sensors such as radio detection and ranging, light detection and ranging, and other technologies to enable the vehicles to detect proximate objects. The vehicles may provide V2X messages such as Basic Safety Messages (BSMs) and Sensor Data Sharing Messages (SDSMs) to share the object detection information with neighboring vehicles. An On Board Unit (OBU) in a vehicle may be configured to receive BSMs and SDSMs from a plurality of vehicles and filter the relevant object detection information. In an example, a SDSM may be discarded based on an association with a BSM. Information elements in the host data of a SDSM may be used to define groups of detected objects, and the detected object data in a SDSM may be partially filtered based on the host data parameters. Relevant groups of detected object information may be decoded and the non-relevant groups may be discarded (i.e., not decoded). Filtering the detected object data may enable a reduction in the processing requirements and timelines, and improve power consumption and thermal considerations. Other capabilities may be provided and not every implementation according to the disclosure must provide any, let alone all, of the capabilities discussed.

BRIEF DESCRIPTION OF THE DRAWINGS

FIGS. 9A-9C are diagrams of example scenarios for determining relevant BSM and SDSM messages.

FIG. 13 is an ASN representation of an example host data portion of a SDSM with additional information elements to enable group based object detection filtering.

DETAILED DESCRIPTION

Figure 1:
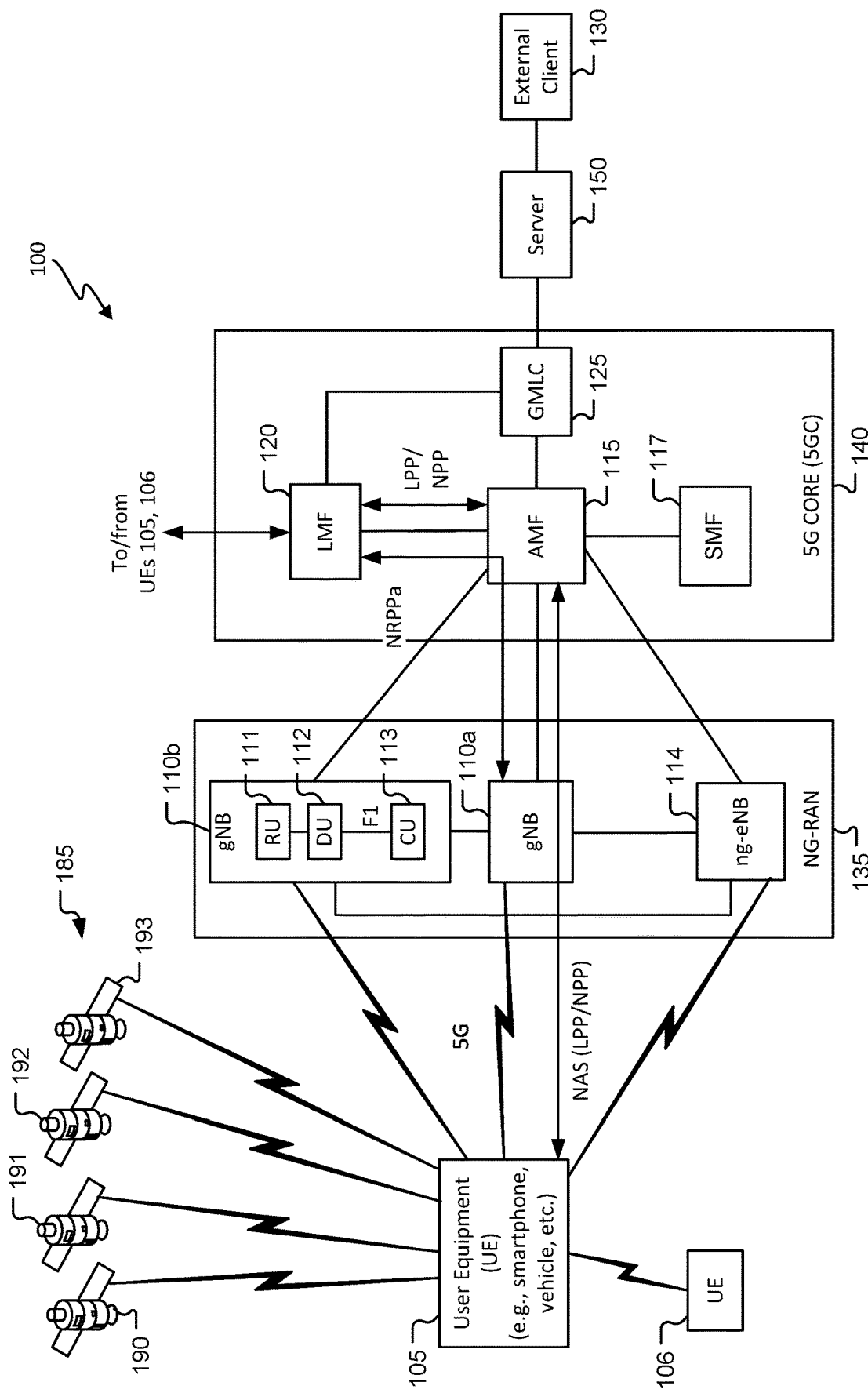
FIG. 1 is a simplified diagram of an example wireless communications system.

Techniques are discussed herein for filtering object detection information provided via V2X communication links. V2X, including cellular V2X (C-V2X) technologies, enables radio frequency (RF) communications between vehicles and other wireless nodes, such as other vehicles, roadside units (RSUs), vulnerable road users (VRUs), and cellular networks. Vehicles may be configured to transmit V2X messages such as basic safety messages (BSMs), and/or dedicated short range communications (DSRC) messages to nearby vehicles and stations (e.g., RSUs). The BSMs may include information elements such as the current location (e.g., latitude, longitude, elevation, position accuracy), and other state information associated with a vehicle (e.g., TransmissionAndSpeed, Heading, BrakeSystemStatus, etc.). Many vehicles and other wireless nodes configured for V2X communications may also include one or more sensors configured to detect proximate objects such as pedestrians, vehicles, obstacles, and other roadside objects. For example, a vehicle may include radar, lidar, optical and other sensor technologies to detect the location of proximate objects and then utilize V2X messaging (e.g., SDSM, CPM) to provide the object detection information to neighboring stations and/or vehicles. The number of detected objects (e.g., non-V2X vehicles, obstacles, VSUs) and the corresponding SDSM/CPM messages will continue to increase as the number of V2X enabled vehicles increase. The techniques provided herein enable efficient filtering of SDSMs to improve processing load and timelines, and help with power/thermal considerations. Filtering the SDSMs may include decoding or discarding portions of the data including in the SDSMs. In an example, the SDSM filtering may be based on additional information in SDSMs, and/or by associating BSMs with SDSMs transmitted from a vehicle and utilizing the BSM information for filtering decisions. Entire SDSMs transmitted from a vehicle may be filtered based on source data or the relevance of the BSMs transmitted by the vehicle. Subsets of detected objects in SDSM may be filtered based on source data including additional information elements. These techniques are examples and other message configurations, however, may be used.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, on-board unit (OBU), etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," a "mobile device," or variations thereof. A UE disposed in a vehicle may be called an on-board unit (OBU). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE (Institute of Electrical and Electronics Engineers) 802.11, etc.) and so on.

A base station may operate according to one of several RATs in communication with UEs depending on the network in which it is deployed. Examples of a base station include an Access Point (AP), a Network Node, a NodeB, an evolved NodeB (eNB), or a general Node B (gNodeB, gNB). In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN), here a Fifth Generation (5G) Next Generation (NG) RAN (NG-RAN) 135, a 5G Core Network (5GC) 140, and a server 150. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The NG-RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. Base stations such as the gNBs 110a, 110b and/or the ng-eNB 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more base stations, e.g., one or more of the gNBs 110a, 110b and/or the ng-eNB 114 may be configured to communicate with the UE 105 via multiple carriers. Each of the gNBs 110a, 110b and/or the ng-eNB 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the gNBs 110a, 110b, the ng-eNB 114, and/or the 5GC 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the gNBs 110*a*, 110*b*, the ng-eNB 114, the 5GC 140, and/or the external client 130. For example, such other devices may include internet of thing (IoT) devices, medical devices, home entertainment and/or automation devices, etc. The 5GC 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110*a*, 110*b*, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The gNBs 110a, 110b and/or the ng-eNB 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

Each of the gNBs 110a, 110b and/or the ng-eNB 114 may include a radio unit (RU), a distributed unit (DU), and a central unit (CU). For example, the gNB 110b includes an RU 111, a DU 112, and a CU 113. The RU 111, DU 112, and CU 113 divide functionality of the gNB 110b. While the gNB 110b is shown with a single RU, a single DU, and a single CU, a gNB may include one or more RUs, one or more DUs, and/or one or more CUs. An interface between the CU 113 and the DU 112 is referred to as an F1 interface. The RU 111 is configured to perform digital front end (DFE) functions (e.g., analog-to-digital conversion, filtering, power amplification, transmission/reception) and digital beamforming, and includes a portion of the physical (PHY) layer. The RU 111 may perform the DFE using massive multiple input/multiple output (MIMO) and may be integrated with one or more antennas of the gNB 110b. The DU 112 hosts the Radio Link Control (RLC), Medium Access Control (MAC), and physical layers of the gNB 110b. One DU can support one or more cells, and each cell is supported by a single DU. The operation of the DU 112 is controlled by the CU 113. The CU 113 is configured to perform functions for transferring user data, mobility control, radio access network sharing, positioning, session management, etc. although some functions are allocated exclusively to the DU 112. The CU 113 hosts the Radio Resource Control (RRC), Service Data Adaptation Protocol (SDAP), and Packet Data Convergence Protocol (PDCP) protocols of the gNB 110b. The UE 105 may communicate with the CU 113 via RRC, SDAP, and PDCP layers, with the DU 112 via the RLC, MAC, and PHY layers, and with the RU 111 via the PHY layer.

As noted, while FIG. 1 depicts nodes configured to communicate according to communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the gNBs 110a, 110b and/or the ng-eNB 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematic (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the 5GC 140, and may provide QoS (Quality of Service) flow and session management. The AMF 115 may support mobility of the UE 105 including cell change and handover and may participate in supporting signaling connection to the UE 105.

The server 150, e.g., a cloud server, is configured to obtain and provide location estimates of the UE 105 to the external client 130. The server 150 may, for example, be configured to run a microservice/service that obtains the location estimate of the UE 105. The server 150 may, for example, pull the location estimate from (e.g., by sending a location request to) the UE 105, one or more of the gNBs 110*a*, 110*b* (e.g., via the RU 111, the DU 112, and the CU 113) and/or the ng-eNB 114, and/or the LMF 120. As another example, the UE 105, one or more of the gNBs 110*a*, 110*b* (e.g., via the RU 111, the DU 112, and the CU 113), and/or the LMF 120 may push the location estimate of the UE 105 to the server 150.

The GMLC 125 may support a location request for the UE 105 received from the external client 130 via the server 150 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130 via the server 150. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110*a*, 110*b* and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110*a* (or the gNB 110*b*) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110*a*, 110*b* or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110*a*, 110*b* or the ng-eNB 114) and/or may be used by the LMF 120 to obtain location related information from the gNBs 110*a*, 110*b* and/or the ng-eNB 114, such as parameters defining directional SS or PRS transmissions from the gNBs 110*a*, 110*b*, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110*a*, 110*b*, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110*a*, 110*b*, the ng-eNB 114, or other base stations or APs).

With a network-based position method, one or more base stations (e.g., the gNBs 110*a*, 110*b*, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110*a*, 110*b*, and/or the ng-eNB 114 to the LMF 120 using NRPPa may include timing and configuration information for directional SS or PRS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110*a*, 110*b*, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110*a* (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 140. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110*a*, 110*b*, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS or PRS beams, sent by base stations (such as the gNBs 110*a*, 110*b*, and/or the ng-eNB 114) that are within range of the UE whose position is to be determined (e.g., the UE 105 of FIG. 1). The UE may, in some instances, use the directional SS or PRS beams from a plurality of base stations (such as the gNBs 110*a*, 110*b*, the ng-eNB 114, etc.) to compute the UE's position.

Figure 2:
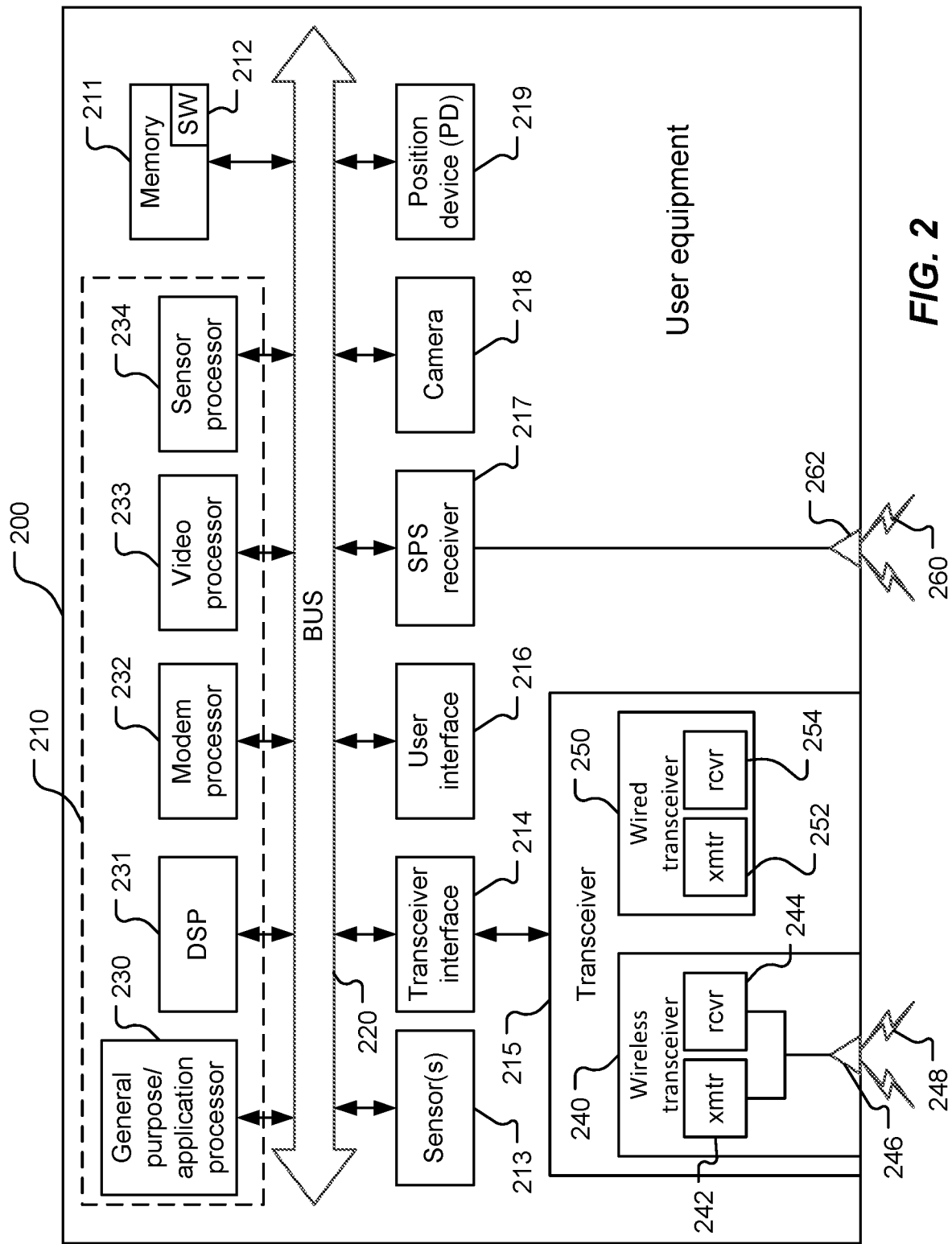
FIG. 2 is a block diagram of components of an example user equipment or an on board unit.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), lidar, and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the general-purpose/application processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the general-purpose/application processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/ report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to an antenna 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. The wireless transmitter 242 includes appropriate components (e.g., a power amplifier and a digital-to-analog converter). The wireless receiver 244 includes appropriate components (e.g., one or more amplifiers, one or more frequency filters, and an analog-to-digital converter). The wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the NG-RAN 135 to send communications to, and receive communications from, the NG-RAN 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215. The wireless transmitter 242, the wireless receiver 244, and/or the antenna 246 may include multiple transmitters, multiple receivers, and/or multiple antennas, respectively, for sending and/or receiving, respectively, appropriate signals.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose/application processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The SPS antenna 262 is configured to transduce the SPS signals 260 from wireless signals to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose/application processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose/application processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS (Complementary Metal-Oxide Semiconductor) imager), a lens, analog-to-digital circuitry, frame buffers, etc. Additional processing, conditioning, encoding, and/or compression of signals representing captured images may be performed by the general-purpose/application processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the wireless signals 248) for trilateration, for assistance with obtaining and using the SPS signals 260, or both. The PD 219 may be configured to determine location of the UE 200 based on a cell of a serving base station (e.g., a cell center) and/or another technique such as E-CID. The PD 219 may be configured to use one or more images from the camera 218 and image recognition combined with known locations of landmarks (e.g., natural landmarks such as mountains and/or artificial landmarks such as buildings, bridges, streets, etc.) to determine location of the UE 200. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the general-purpose/application processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general-purpose/application processor 230, the transceiver 215, the SPS receiver 217, and/or another component of the UE 200, and may be provided by hardware, software, firmware, or various combinations thereof.

Figure 3:
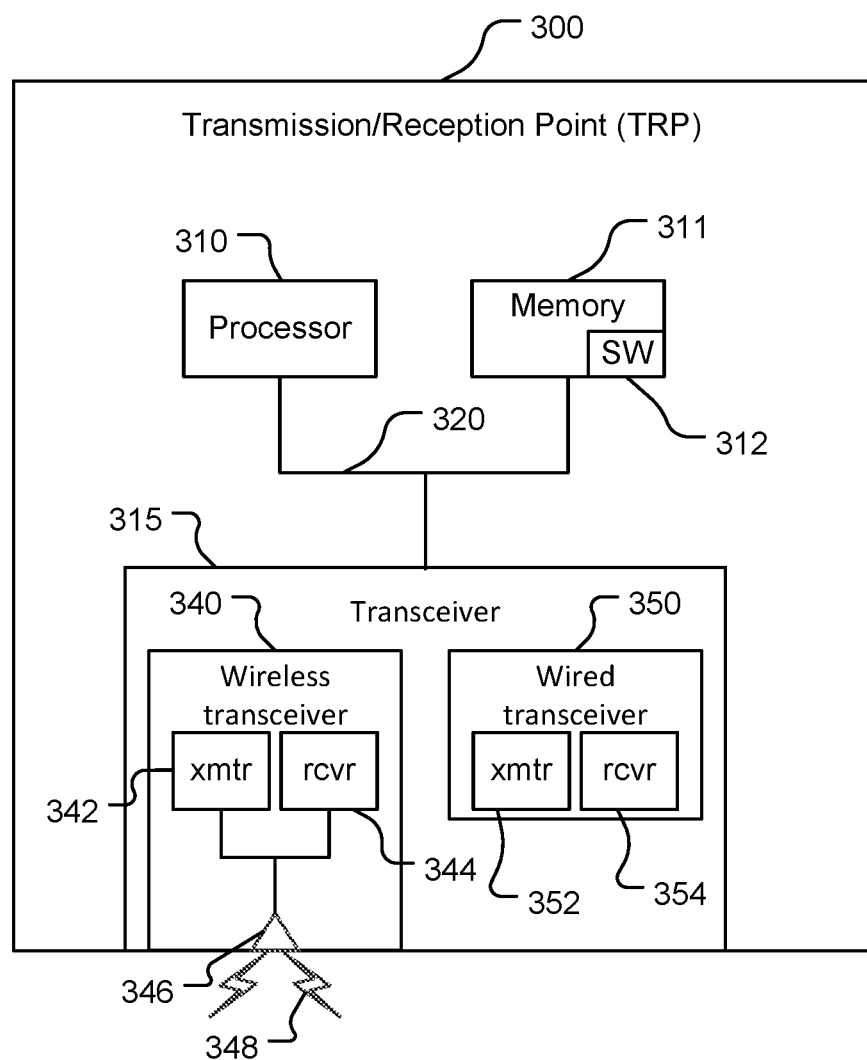
FIG. 3 is a block diagram of components of an example transmission/reception point.

Referring also to FIG. 3, an example of a TRP 300 of the gNBs 110a, 110b and/or the ng-eNB 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless transceiver) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the gNBs 110a, 110b and/or the ng-eNB 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the NG-RAN 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions). In an example, a RSU may include some or all of the components of a TRP 300.

Figure 4:
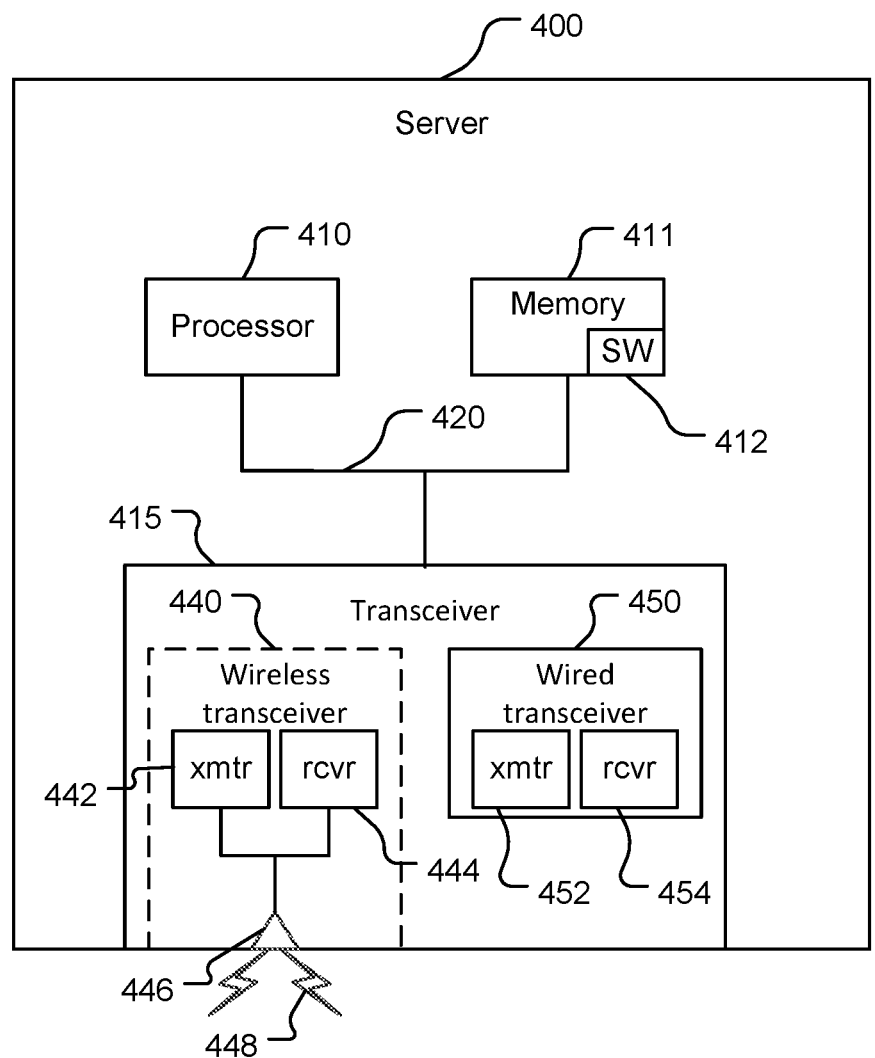
FIG. 4 is a block diagram of components of a server.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless transceiver) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the NG-RAN 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx \to Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Tx \to Rx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message(s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS, CSI-RS (Channel State Information—Reference Signal)), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., by modulating a carrier signal with the PN code) such that a source of the PRS may serve as a pseudo-satellite (a pseudolite). The PN code may be unique to the PRS source (at least within a specified area such that identical PRS from different PRS sources do not overlap). PRS may comprise PRS resources and/or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-ResourceSet, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Common resource blocks are the set of resource blocks that occupy a channel bandwidth. A bandwidth part (BWP) is a set of contiguous common resource blocks and may include all the common resource blocks within a channel bandwidth or a subset of the common resource blocks. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource (or simply resource) can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple OFDM (Orthogonal Frequency Division Multiplexing) Resource Elements (REs) that may be in multiple Resource Blocks (RBs) within N (one or more) consecutive symbol(s) within a slot. PRS resources (or reference signal (RS) resources generally) may be referred to as OFDM PRS resources (or OFDM RS resources). An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments into a unified piece such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (Base Transceiver Station) (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning being sent by UEs, and with PRS and SRS for positioning being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

Figure 5:
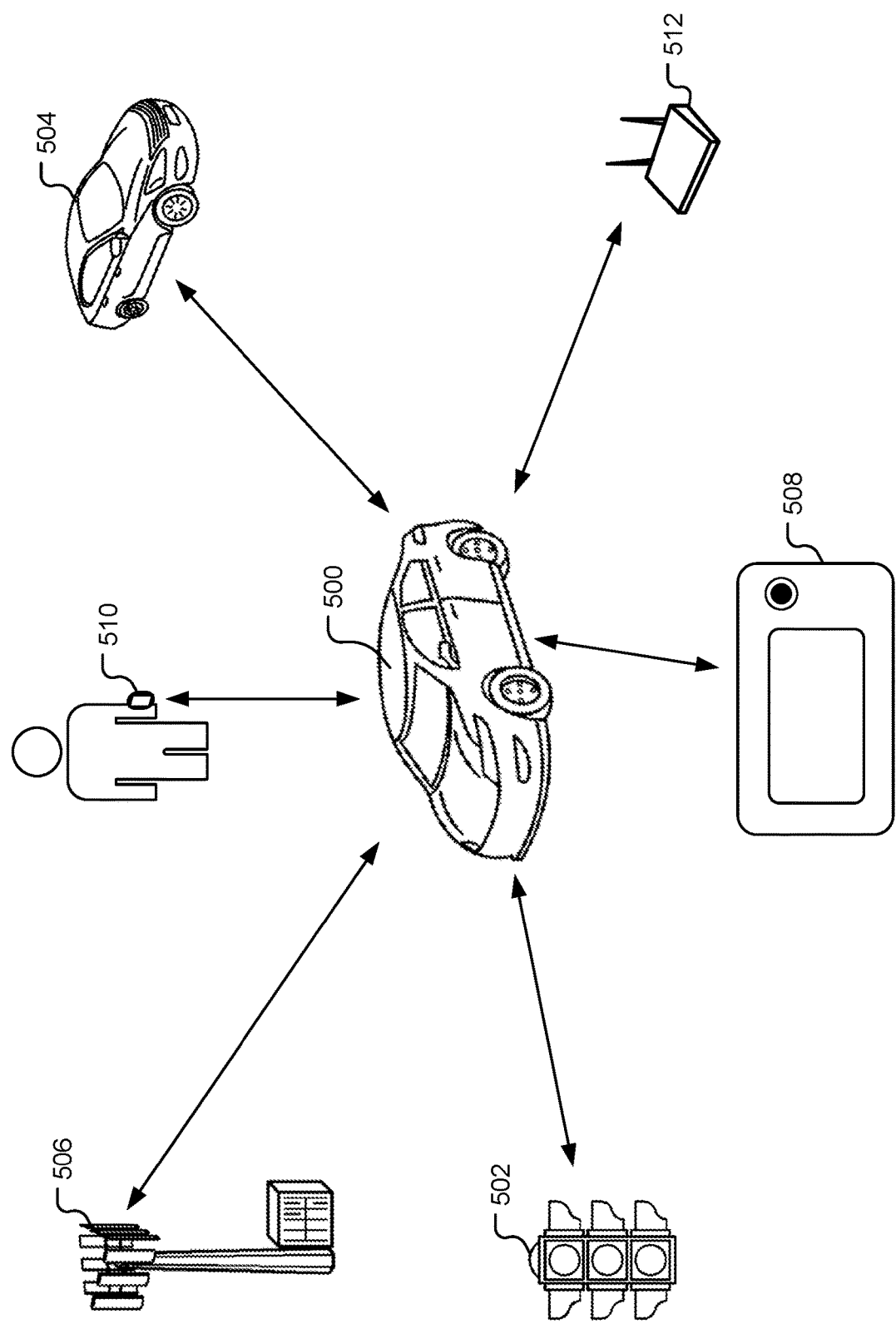
FIG. 5 is a system diagram illustrating the various entities configured to utilize V2X communication links.

Referring to FIG. 5, a system diagram illustrating various entities configured to utilize V2X communication links is shown. In general, V2X communication involves passing information between a vehicle and any other entity that may affect or be affected by the vehicle. A vehicle may include an OBU which may have some or all of the components of the UE 200, and the UE 200 is an example of an OBU. The OBU may be configured to communicate with other entities such as infrastructure (e.g., a stop light), pedestrians, other vehicles, and other wireless nodes. In an example, V2X may encompass other more specific types of communication such as Vehicle-to-Infrastructure (V2I), Vehicle-to Vehicle (V2V), Vehicle-to-Pedestrian (V2P), Vehicle-to-Device (V2D), and Vehicle-to-Grid (V2G).

Vehicle-to Vehicle (V2V) is a communication model designed to allow vehicles or automobiles to "talk" to each other, typically by having the automobiles form a wireless ad hoc network on the roads. Vehicle-to-Infrastructure (V2I) is a communication model that allows vehicles to share information with the components that support a road or highway system, such as overhead radio-frequency identification (RFID) readers and cameras, traffic lights, lane markers, streetlights, signage and parking meters, and so forth. Similar to V2V communication, V2I communication is typically wireless and bi-directional: data from infrastructure components can be delivered to the vehicle over an ad hoc network and vice versa. Vehicle-to-Pedestrian (V2P) communications involves a vehicle or automobile being able to communicate with, or identify a broad set of road users including people walking, children being pushed in strollers, people using wheelchairs or other mobility devices, passengers embarking and disembarking buses and trains, and people riding bicycles. Vehicle-to-Device (V2D) communications consists in the exchange of information between a vehicle and any electronic device that may be connected to the vehicle itself. Vehicle-to-Grid (V2G) communication may include a vehicle communicating with an electric power grid.

These more specific types of communication are useful for fulfilling various functions. For instance, Vehicle-to-Vehicle (V2V) is especially useful for collision avoidance safety systems, while Vehicle-to-Pedestrian (V2P) is useful for safety alerts to pedestrians and bicyclists. Vehicle-to-Infrastructure (V2I) is useful for optimizing traffic light control and issuing speed advisories, while Vehicle-to-Network (V2N) is useful for providing real-time traffic updates/routing and cloud services.

As referred to herein, V2X communications may include any of these more specific types of communication, as well as any communications between a vehicle and another entity that do not fall under one of these existing communications standards. Thus, V2X is a rather broad vehicular communication system.

V2X communication may be based on Institute of Electrical and Electronics Engineers (IEEE) 802.11 wireless local area network (WLAN) technology, LTE/5G NR PC5 and/or Uu interfaces, with vehicles and entities (e.g., V2X senders) communicating through an ad-hoc network that is formed as two V2X senders come into range with each other. Cellular-based solutions also exist, such as 5G NR-based V2X, which are capable of leveraging that technology to provide secure communication, precise positioning, and efficient processing. For example, C-V2X may utilize the communications system 100 described in FIG. 1 for V2X communication links.

One benefit of V2X communication is safety. For instance, V2X communication can enable a vehicle to communicate with its surroundings, such that the vehicle can increase driver awareness and provide driving assistance to the driver. For instance, the vehicle may be aware of other moving vehicles and pedestrians on the road. The vehicle can then communicate their locations to the driver, who may be unaware. If accidents are avoided this way, then the safety of the other vehicles and pedestrians on the road is improved. This is just one use case for V2X for improving safety. Other examples of V2X use cases directed to safety include forward collision warning, lane change warning/blind spot warning, emergency electric brake light warning, intersection movement assist, emergency vehicle approaching, road works warning, and platooning.

The V2X communication standard also aims to develop an Advanced Driver Assistance System (ADAS), which helps the driver make critical decisions when it comes to lane changing, speed changing, overtaking speed, and so forth. ADAS can assist driving in challenging conditions, such as bad weather, low lighting, low visibility, and so forth. ADAS can also be used for non-line-of-sight sensing, overtaking (e.g., passing other vehicles on the road), cooperative driving, and do not pass (DNP) alerts.

V2X communication standards may also provide assistance in different modes. A first V2X mode may be utilize to increase driver awareness. For example, the vehicle can use its knowledge of the positions of the various other vehicles on the road in order to provide the driver a bird's eye view of an intersection, or to provide the driver with see-through capability when driving behind a truck (e.g., the vehicle will visually display to the driver the other vehicles on the other side of the truck that are obscured by the truck). A second V2X mode may be configured to provide cooperative driving and collision avoidance. For example, V2X can be used for platooning to tightly group vehicles on the road by enabling those vehicles to communicate and accelerate/brake simultaneously. V2X can also be used for regulating vehicle speed or overtake negotiation, in which a vehicle is able to signal its intent to overtake other vehicles in order to secure the overtaking situation. A third V2X mode may be utilized by vehicles that are configured for autonomous driving.

In an example, a vehicle 500 may be able to communicate with infrastructure 502 (e.g., a traffic light) using Vehicle-to-Infrastructure (V2I) communication. In some embodiments, the vehicle 500 may be able to communicate with other vehicles on the road, such as vehicle 504, via Vehicle-to Vehicle (V2V) communication. The vehicle 500 may be able to communicate with a cellular station 506 via a cellular protocol such as the Uu interface. The cellular station 506 may be a base station such as the gNB 110a, and may include some or all of the components of the TRP 300. In an example, the vehicle 500 may be able to communicate with device 508 via Vehicle-to-Device (V2D) communication. In some of such embodiments, the device 508 may be any electronic device that may be connected to the vehicle itself. For example, the device 508 may be a third party or on-board GPS navigation device, which the vehicle 500 can communicate with to obtain information available to the device 508. If the GPS navigation device had information regarding congested routes, traffic density, the location of other vehicles on the road with similar devices, and so forth, the vehicle 500 may be able to obtain all that information.

In an example, the device 508 may include a user interface display, audio, and/or haptic components configured to provide alerts to a user.

In an example, the vehicle 500 may be able to detect a UE, or other wireless device, carried by a pedestrian 510 via Vehicle-to-Pedestrian (V2P) technology. For instance, the vehicle 500 may have a detection method such as cameras or sensors that allow the vehicle 500 to detect and confirm the presence of pedestrian 510 on the road. Pedestrian 510 may encompass a broad set of people, including people walking, children being pushed in strollers, people using wheelchairs or other mobility devices, passengers embarking and disembarking buses and trains, people riding bicycles, and so forth.

In an example, the vehicle 500 may be configured to communicate with a roadside unit (RSU) 512, or other networked devices such as a AP. The RSU may be disposed in high traffic areas and may be configured to perform the messaging techniques described herein. The RSU 512 may include some or all of the components of the TRP 300. In general, a RSU is less capable than a TRP since the coverage area of the RSU is less than the TRP.

In some embodiments, the vehicle 500 and the other entities in FIG. 5, may also be able to receive information from a network or server, such as the server 400 (not shown in FIG. 5). The vehicle 500 may be able to communicate with the network and server to receive information about the locations and capabilities of infrastructure 502, vehicle 504, cellular stations 506, pedestrian 510, and the RSU 512 without having to communicate with those entities directly.

Figure 6:
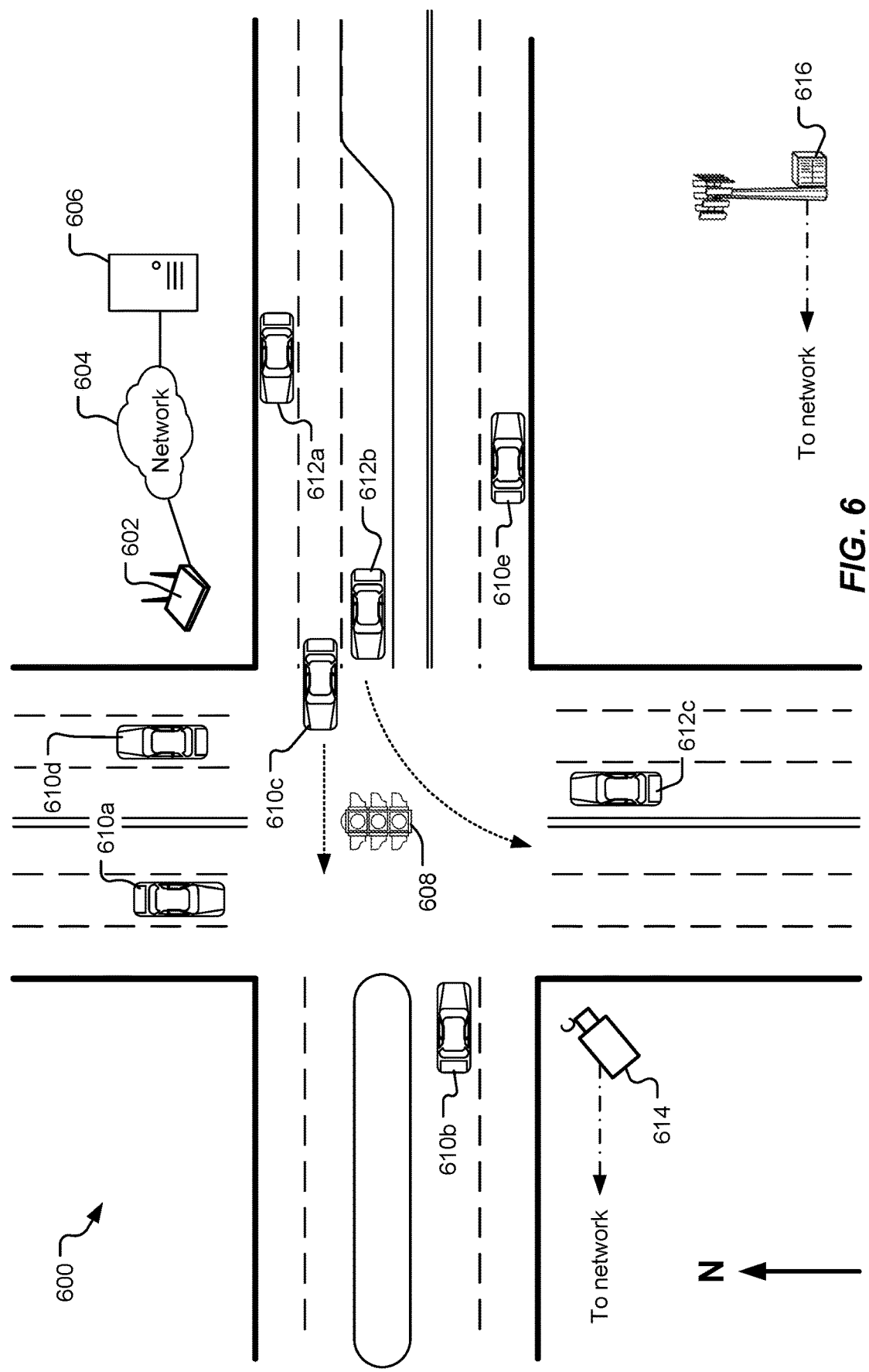
FIG. 6 is a diagram of example use cases for providing BSMs and SDSMs to vehicles and other stations via V2X messaging.

Referring to FIG. 6, a diagram of an example use cases for providing Basic Safety Messages (BSMs) and Sensor Data Sharing Messages (SDSMs) is shown. The diagrams include an intersection 600 with at least one traffic light 608, an RSU 602 configured to communicate with entities proximate to the intersection 600 such as a plurality of vehicles, the traffic light 608, other signal devices and sensors/detectors (e.g., vehicle detection devices, pedestrian crosswalk signals, etc.). The RSU 602 may be communicatively coupled to a server 606 via a network 604. The server 606 may be configured as a multi-access edge computing (MEC) server. The network 604 may include a WAN and/or the Internet. The intersection 600 may also include one or more cameras 614 configured to capture images of the vehicles at the intersection 600 and provide the image information to the RSU 602, the network 604, and/or the server 606. The intersection 600 may be within the coverage area of one or more cellular base stations, such as the base station 616. The base station 616 may be communicatively coupled to the RSU 602 and/or the server 606 via the network 604. The entities located at the intersection 600 may be configured to utilize V2X communication technologies such as WiFi, PC5 and Uu interfaces.

The use cases in FIG. 6 provide examples of BSM and SDSM reporting between multiple vehicles and/or other stations (e.g., the RSU 602) and corresponding context to illustrate that some BSM and SDSM information transmitted by some stations may be more relevant to one subset of the vehicles and less relevant to another subset of the vehicles. The vehicles at the intersection 600 may include V2X capable vehicles 610a-e and non-V2X capable vehicles 612a-c. The locations and capabilities of the vehicles 610a-e, 612a-c are examples to facilitate the explanation of the potential volume of message traffic and the corresponding need to filter messages by excluding non-relevant messages and/or data components. The V2X capable vehicles 610a-e may be configured to periodically (e.g., 100, 200, 500 ms, etc.) transmit BSMs and SDSMs including object detection information obtained with onboard sensors. A first vehicle 610a may be heading south to the intersection 600 and may transmit BSMs based on its position, and SDSMs including detected object information associated with a second vehicle 610b heading east into the intersection, a third vehicle 612c heading north into the intersection 600, and a fourth vehicle 610d heading north from the intersection 600. Other objects may also be within the range of the onboard sensors and included in the SDSMs. The second vehicle 610b may be configured to receive the BSMs and SDSMs transmitted from the first vehicle 610a as well as to transmit BSMs and SDSMs based on objects detected with the sensors onboard the second vehicle 610b, such as the third vehicle 612c, a fifth vehicle 610c crossing the intersection 600, a sixth vehicle 612b in the left turn lane, and a seventh vehicle 610e driving east away from the intersection 600. The first vehicle 610a may be configured to receive the BSMs and SDSMs from the second vehicle 610b. Each of the V2X capable vehicles may transmit and receive the BSMs and SDSMs to and from one another as described, which may create an increased processing load for the respective OBUs to decode the volume of messages. The techniques provided herein enable the OBUs to filter the V2X messages to reduce the processing requirements.

The filtering techniques may be based on the contextual relevance of the reporting vehicles and the locations and/or states of the detected objects. For example, the first vehicle 610a is approaching the intersection 600 from the north so the locations of other vehicles approaching the intersection 600, such as the second vehicle 610b, the third vehicle 612c, the fifth vehicle 610c, the sixth vehicle 612b, and an eighth vehicle 612a are relevant because they represent a risk of collision. Conversely, the locations of the fourth vehicle 610d heading north away from the intersection, and the seventh vehicle 610e heading away from the intersection 600 are less relevant to the first vehicle 610a because the risk of collision is low. Similarly, the seventh vehicle 610e may be configured to send BSMs and SDSMs to report the detection of the eighth vehicle 612a, but the BSMs and SDSMs transmitted by the other vehicles proximate to the intersection 600 are no longer relevant because the seventh vehicle 610e is travelling away from the intersection 600. In general, the relevance of a BSM and/or SDSM object detection information is based on the risk of collision with the transmitting vehicle (e.g., the BSM) or the corresponding object (e.g., SDSM object information). Factors such as the positions and trajectories of the vehicles, geometry of the environment, road and traffic conditions, environmental conditions (e.g., day, night, rain, snow, fog, etc.), and vehicle performance factors (e.g., stopping distance) may be used to determine the relevance of a BSM and/or SDSM.

As described in FIG. 6, the BSMs and SDSMs may be sent and received by the vehicles and other stations in the network such as the RSU 602. In an example, roadside sensors and cameras may be configured to communicate with the network 604, and the server 606 and/or the RSU 602 may be configured to utilize the network sensor data to detect objects and generate SDSMs. The RSU 602, or other stations such as the base station 616, may be configured to transmit the SDSMs to the vehicles.

Figure 7:
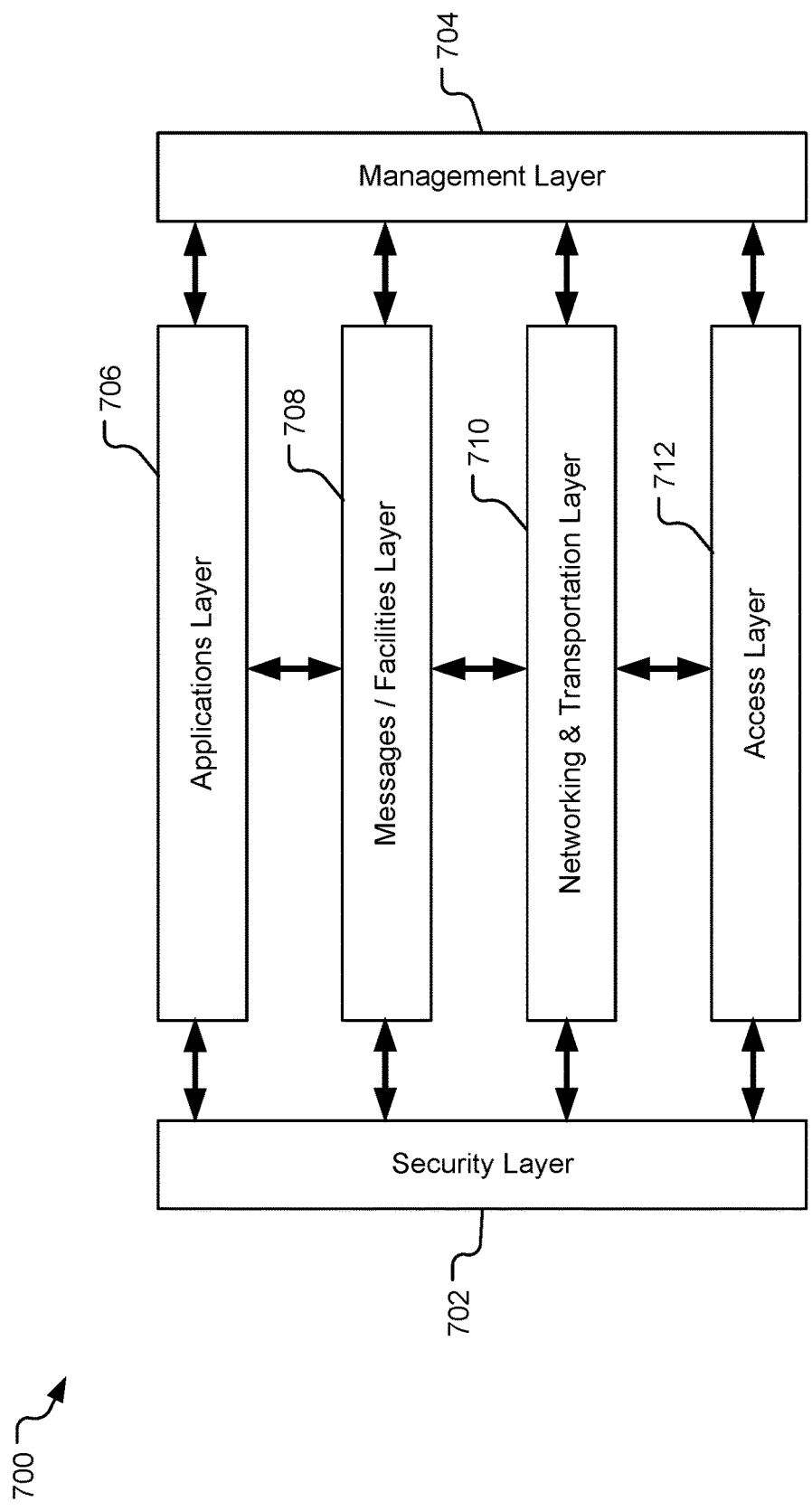
FIG. 7 is an example diagram of the Intelligent Transportation Systems (ITS) stack reference architecture.

Referring to FIG. 7, an example diagram 700 of the ITS stack reference architecture is shown. In general, the ITS access technologies layer 712 may include various communication media and related protocols for the physical and data link layers. In an example, the SDSM filtering techniques described herein may occur at the ITS stack or at lower layers. The access layer 712 may include the access technologies in the ITS stack. The access layer 712 is not restricted to specific types of media, but is typically based on wireless access technologies for wireless communication. The access technologies may be used for communication inside of an ITS station (e.g., a UE, OBU, RSU, etc.) and for external communication (e.g., with other ITS stations). For external communication, some of the ITS access technologies represent complete, non ITS specific communication systems (such as, GPRS, UMTS, WiMAX) that are regarded as 'logical links' over which ITS data is transparently transported. A ITS network & transport layer 710 comprises protocols for data delivery among ITS stations and from ITS stations to other network nodes, such as network nodes in the core network (e.g. the Internet). The ITS network protocols may include the routing of data from source to destination through intermediate nodes and the dissemination of data in geographical areas. The ITS transport protocols may provide the end to end delivery of data and, depending on requirements of ITS facilities and applications, additional services, such as data transfer, flow control and congestion avoidance. A particular protocol in the ITS network & transport layer is the Internet protocol IP version 6 (IPv6). The usage of IPv6 includes the transmission of IPv6 packets over ITS network protocols, dynamic selection of ITS access technologies and handover between them, as well as interoperability issues of IPv6 and IPv4. An ITS facilities layer 708 may provide a collection of functions to support ITS applications. The facilities provide data structures to store, aggregate and maintain data of different types and sources such as from vehicle sensors and from data received by other communication. The ITS facilities may enable various types of addressing to applications, provide ITS specific message handling and support establishment and maintenance of communication sessions. The facilities may include management of services such as the discovery and download of services as software modules and their management in the ITS station. An ITS applications layer 706 refers to ITS applications and use cases for road safety, traffic efficiency, infotainment and business. The ITS stack may include two vertical protocol entities such as an ITS management layer 704 and a ITS security layer 702. The ITS management layer 704 may be responsible for the configuration of an ITS station, cross layer information exchange among the different layers and others tasks. The ITS security layer 702 may be configured to provide security and privacy services, including secure messages at different layers of the communication stack, management of identities and security credentials, and aspects for secure platforms (firewalls, security gateway, tamper proof hardware). The ITS stack in FIG. 7 is an example, and not a limitation, as other protocols and messaging techniques may be used to communicate BSMs and SDSMs as described herein.

Figure 8:
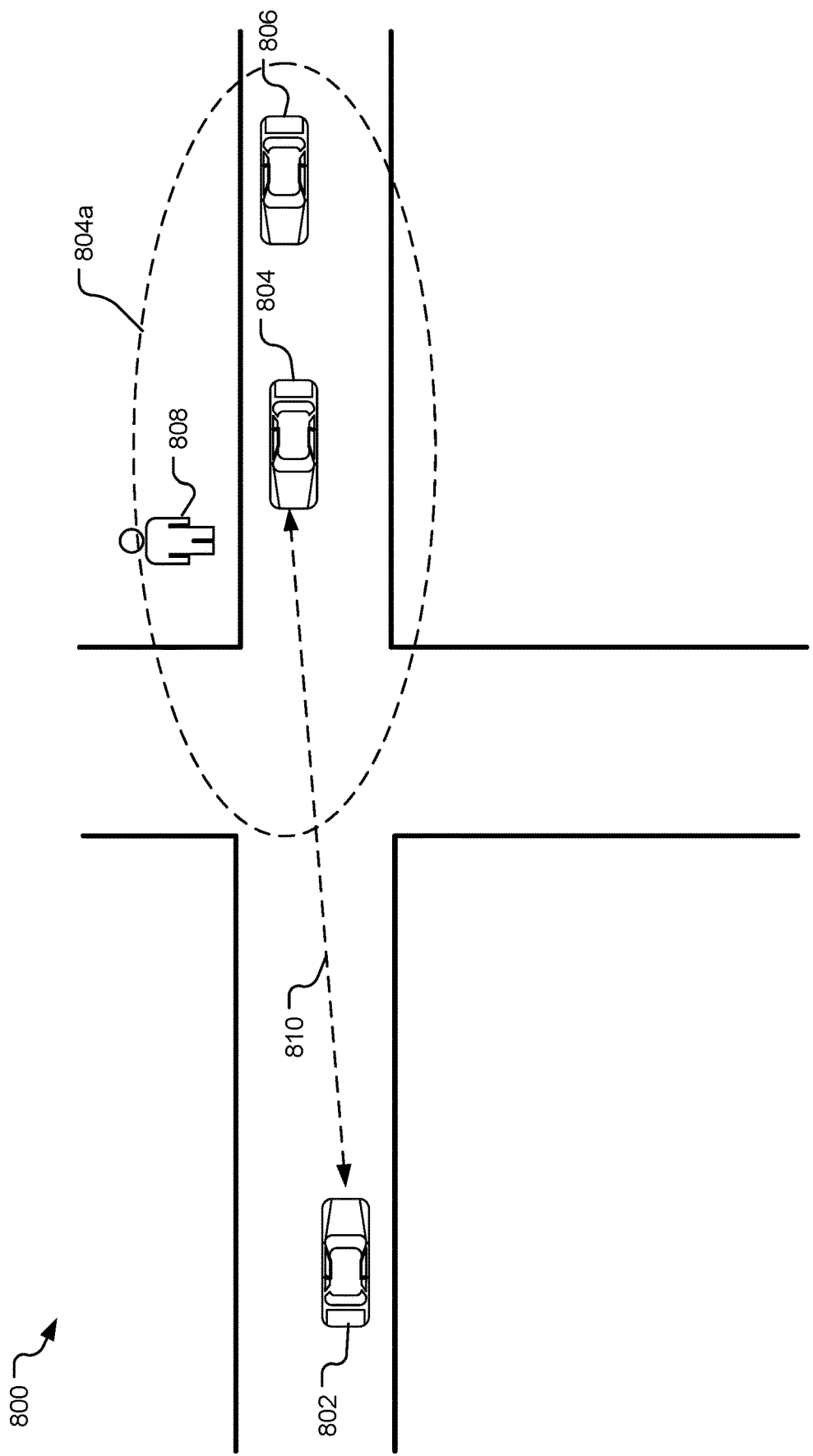
FIG. 8 is a diagram of an example use case for transmitting safety and object detection messages between vehicles.

Referring to FIG. 8, a diagram of an example use case for transmitting safety and object detection messages between vehicles is shown. The use case depicts and intersection 800 with a first V2X enabled vehicle 802, a second V2X enabled vehicle 804, a non-V2X vehicle 806, and a pedestrian (e.g., VRU) 808. The second vehicle 804 includes onboard sensors and is configured to detect objects within a detection range 804a. The onboard sensors may include radar, lidar, cameras and other RF signaling to detect proximate objects and stations. For example, the second vehicle 804 may utilize a backward facing camera to detect the non-V2X vehicle 806 and RF signaling (e.g., V2P) to detect the VRU 808. The second vehicle 804 may utilize a RF link 810 (e.g., V2X messages, DSRC messages) to communicate safety and object detection information. In an example, the safety information may be included in BSMs and the object detection information may be included in SDSMs. The first vehicle 802 may utilize the BSMs and SDSMs to determine the location of the second vehicle 804, the non-V2X vehicle 806 and the VRU 808. The first vehicle 802 may utilize the corresponding object location information for vehicle control, such as reducing speed, altering course, activating lights, etc.

Figure 9B:
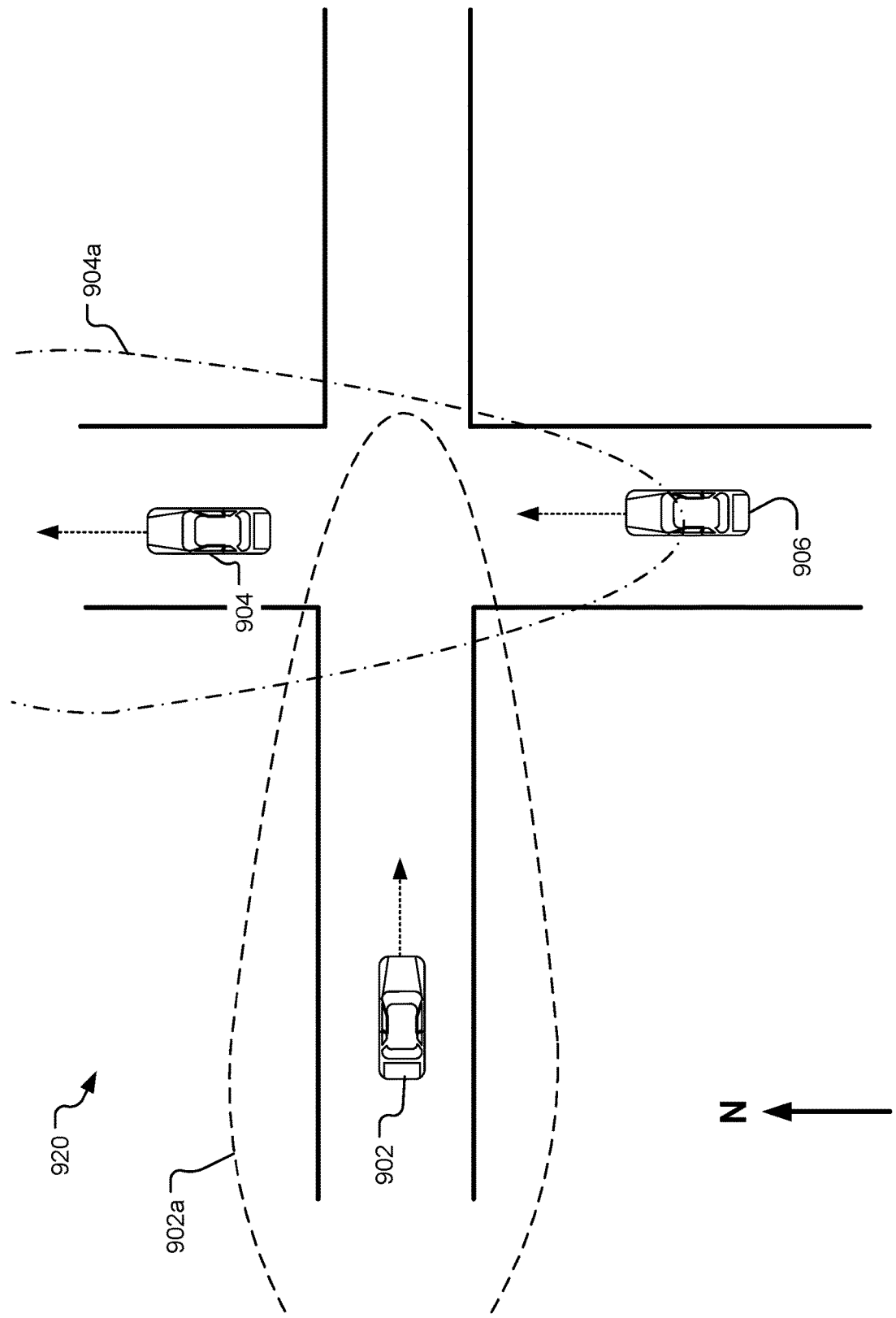

Referring to FIGS. 9A-9C, diagrams of example scenarios for determining relevant BSM and SDSM messages is shown. FIG. 9A depicts a first scenario 900 with a first V2X configured vehicle 902, a second V2X configured vehicle 904, and a non-V2X vehicle 906. The first vehicle 902 has a first object detection area 902a and the second vehicle 904 has a second object detection area 904a. The object detection areas 902a, 904a may be based on onboard sensors such as cameras and radar units installed on the respective vehicles 902, 904. In the first scenario 900, the non-V2X vehicle 906 is outside of the first detection area 902a and within the second detection area 904a. A BSM transmitted by the second vehicle 904 at this time is relevant to the first vehicle 902 because there is a risk of collision based on current locations of the first and second vehicles 902, 904. A SDSM transmitted by the second vehicle 904 will include information for the non-V2X vehicle 906 because it is located in the second object detection area 904a. The SDSM transmitted by the second vehicle 904 is relevant to the first vehicle 902 because it is reporting information on the non-V2X vehicle 906 which is outside of the first object detection area 902a (i.e., it is not detected by the first vehicle 902) and there is a risk of collision based on the locations of the vehicles 902, 906.

FIG. 9B depicts a second scenario 920 with the first V2X configured vehicle 902, the second V2X configured vehicle 904, and the non-V2X vehicle 906. In the second scenario 920, the second vehicle 904 and the non-V2X vehicle 906 are outside of the first object detection area 902a, and the non-V2X vehicle 906 is within the second object detection area 904a. A BSM transmitted by the second vehicle 904 at this time is not relevant to the first vehicle 902 because the second vehicle 904 has travelled away from the intersection, and there is no risk of collision based on current locations of the first and second vehicles 902, 904. The SDSM transmitted by the second vehicle 904, however, is relevant to the first vehicle 902 because it is reporting information on the non-V2X vehicle 906 which is outside of the first object detection area 902a (i.e., it is not detected by the first vehicle 902) and there is a risk of collision based on the locations of the vehicles 902, 906.

FIG. 9C depicts a third scenario 950 with the first V2X configured vehicle 902, the non-V2X vehicle 906, and a third V2X configured vehicle 908. A third object detection area 908a is based on the capabilities of the sensors in the third vehicle 908. In the third scenario 950, the non-V2X vehicle 906 is outside of the first object detection area 902a, and the third vehicle 908 is within the first object detection area 902a. A BSM transmitted by the third vehicle 908 at this time is relevant to the first vehicle 902 because the third vehicle 908 is in the intersection and there is a risk of collision based on the current locations of the first and third vehicles 902, 908. The SDSM transmitted by the third vehicle 908, however, is not relevant to the first vehicle 902 because it is reporting information on the non-V2X vehicle 906 which has travelled past the intersection and there is no risk of collision based on the locations of the vehicles 902, 906.

The locations and capabilities of the vehicles 902, 904, 906, 908 are examples to demonstrate sample use cases and the capability to determine relevance based on the locations of the vehicles and the geometry of the environment. Other factors, such as capabilities of the vehicles, road conditions, and environmental conditions may be used to determine the risk of collision and hence the relevancy of the transmitted BSMs and SDSMs. Relevancy determinations may be made for multiple vehicles in an area (e.g., as depicted in FIG. 6) and may be used to filter the SDSM messages, or portions of the SDSM messages, transmitted by the vehicles.

In operation, in an example, an entire SDSM may be filtered prior to decoding based on its association with BSMs from the same sender. For example, a receiver in an OBU may be configured to determine whether to discard a SDSM transmitted from a vehicle based on the information contained in a BSM transmitted by the same vehicle. The OBU may be configured to determine the relevancy of the BSM based on the position information in the transmitted BSM (e.g. position), and other location information such as the OBU's own position/future trajectory, and geometry of the environment (e.g., map data). The BSM and SDSM transmitted from the remote vehicle may be associated with one another based on the information contained in the messages. In an example, the association may be based on a TempID contained in each of the BSM and SDSM. If the remote vehicle uses the same TempID for the transmitted BSM and SDSM, then the SDSM may be filtered post verification. In an example, the association of the BSM and SDSM may be based on certificate values if both messages are signed with the same certificate. For example, if each of the messages contains the hash of the other message's signing certificate. Once the SDSM has been associated with the BSM and a decision has been made to discard the SDSM, the filtering can happen at the ITS stack or at lower layers (e.g. using L2 source address). The SDSM associated with a non-relevant BSM may be discarded.

Figure 10:
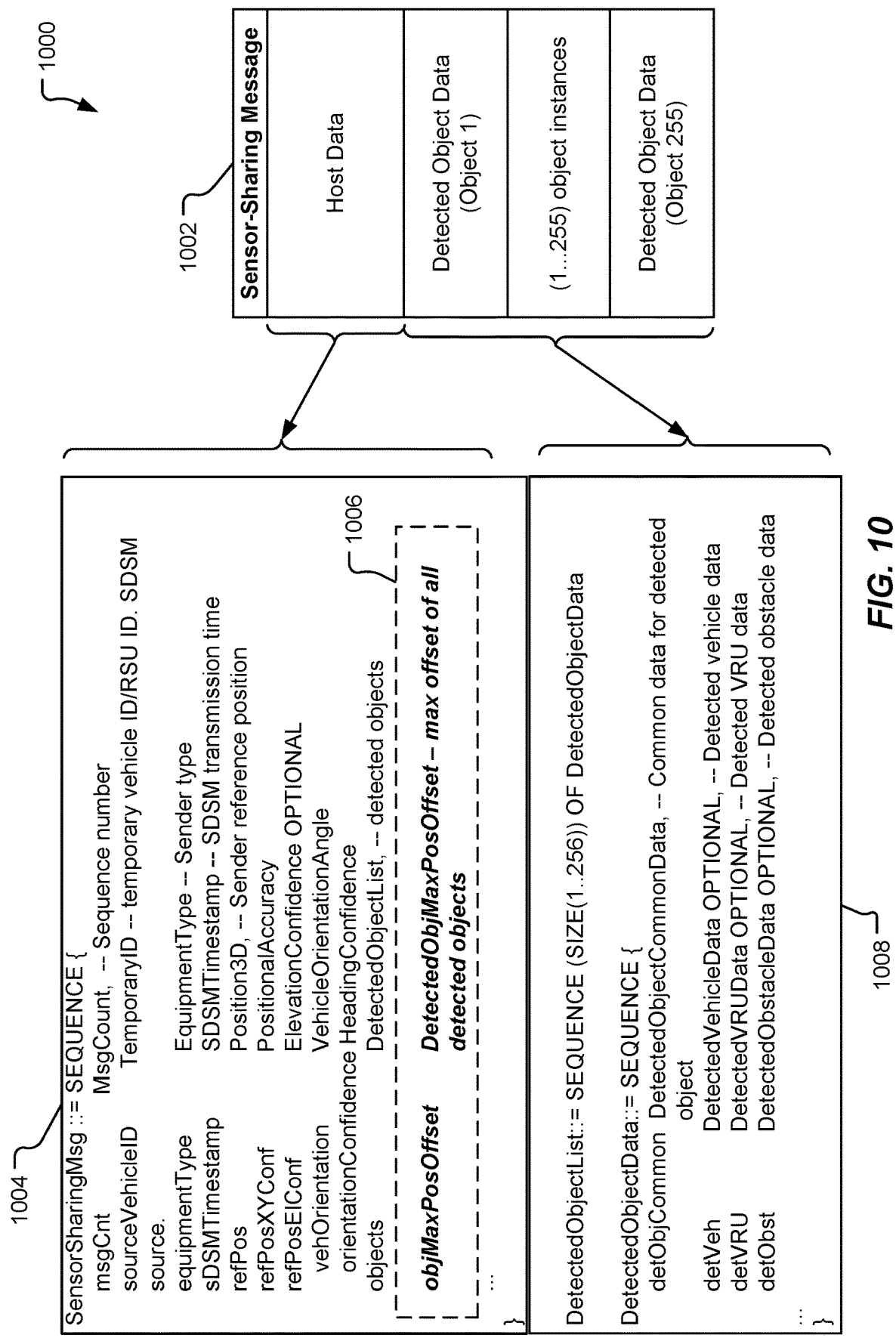
FIG. 10 is an Abstract System Notation (ASN) representation of an example SDSM.

Referring to FIG. 10, a diagram 1000 of an ASN representation of an example SDSM 1002 is shown. The SDSM 1002 includes a first portion comprising host data 1004, and a second portion comprising detected object data 1008. In an example, the detected object data 1008 may be indexed and may include object data for up to 255 object instances. In an example, the SDSM filtering techniques described herein may utilize one or more information elements in the host data 1004 to filter the SDSM messages and/or decode or discard one or more object instances.

In operation, in an example, an entire SDSM may be filtered by only decoding the Host Data portion of the SDSM. In an example, a objMaxPostionOffset information element (IE) 1006 denoting the maximum position offset among all detected objects may be included in the host data 1004 (i.e., the first portion) of the SDSM message. Thus, the maximum position offset may define an area of interest for a vehicle receiving the SDSM, and objects within the maximum position offset may be decoded if they are relevant to the receiving vehicle.

Figure 11A:
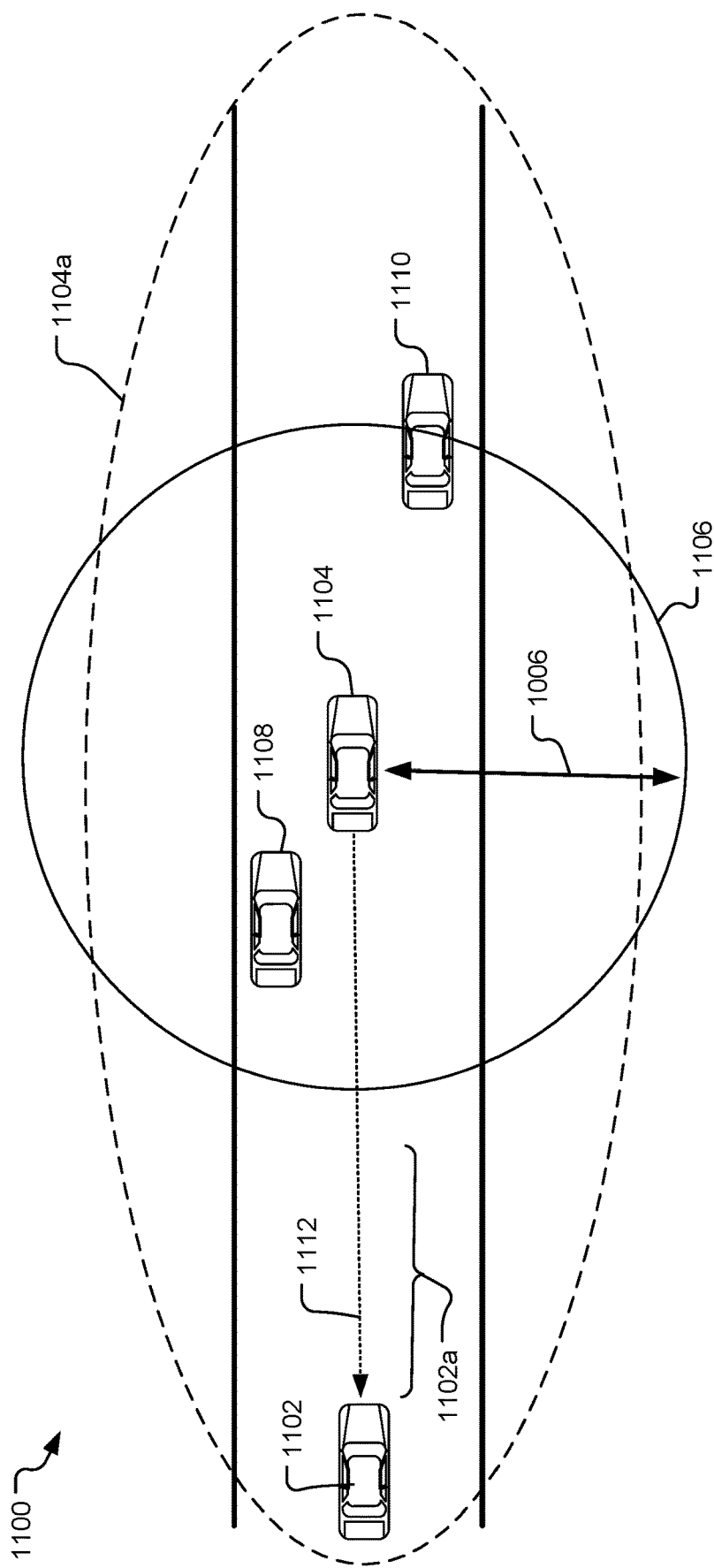
FIGS. 11A and 11B are diagrams of example relative positions between a vehicle and an area of interest.
Figure 11B:
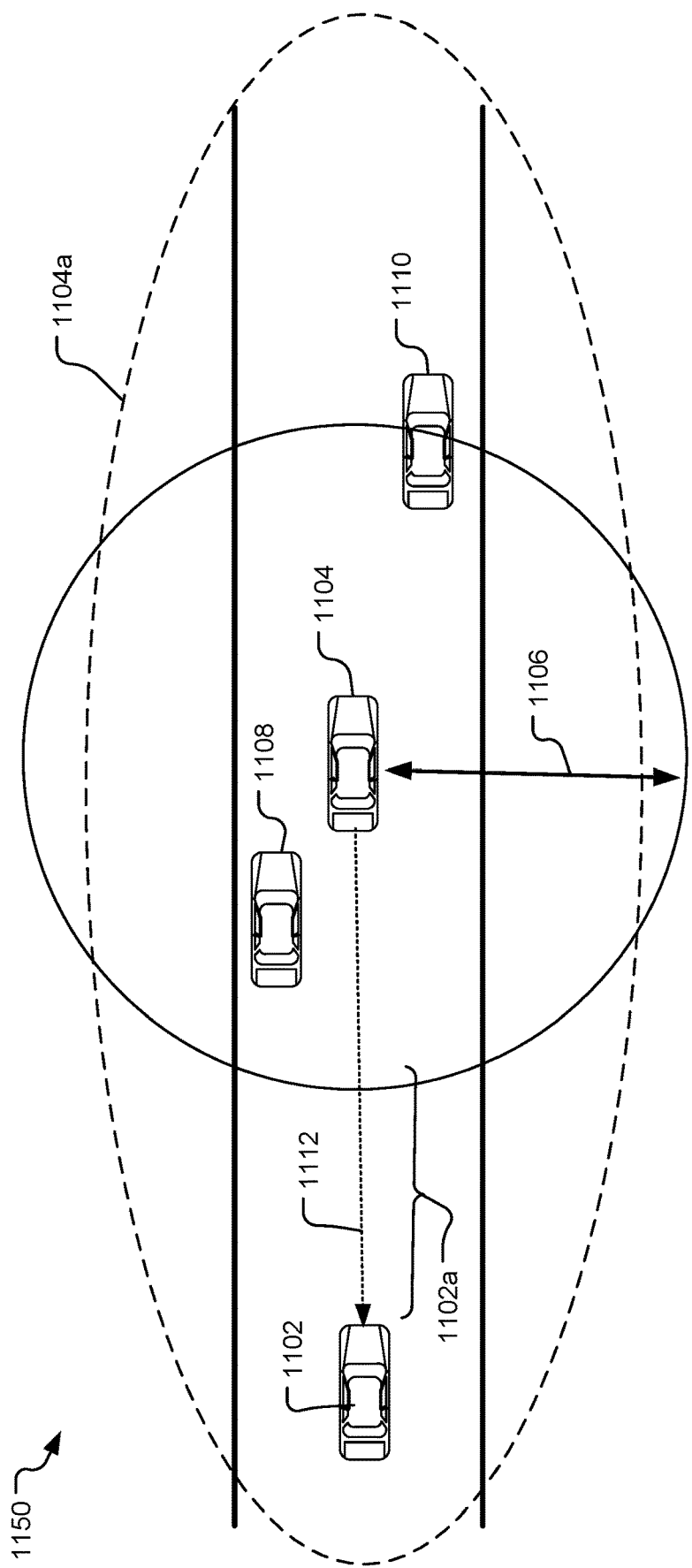

Referring to FIGS. 11A and 11B, diagrams of example relative positions between a vehicle and an area of interest are shown. A first diagram 1100 includes a first V2X capable vehicle 1102, a second V2X capable vehicle 1104, and a plurality of detected objects such as a third vehicle 1108 and a fourth vehicle 1110. The third and fourth vehicles 1108, 1110 may be non-V2X capable vehicles or other objects. The second vehicle 1104 has a SDSM communication range 1104*a* and is transmitting BSM and SDSM to the first vehicle 1102 via a communication link 1112. The host data 1004 for the SDSM transmitted by the second vehicle 1104 includes a maximum position offset IE 1006 to define an area of interest 1106 around the second vehicle. The first vehicle 1102 has a relevancy distance 1102*a* to define a distance in front of the first vehicle 1102 for filtering object detection data. The relevancy distance 1102*a* may be a user setting, or may be based on the capabilities of the first vehicle 1102, geometry of the roadway, vehicle state (e.g., speed, incline, decline), road conditions, or other driver and/or environmental factors (e.g., day, night, visibility, driver fatigue, etc.). The relative distances between the first and second vehicles 1102, 1104 may be based on the terrestrial and/or satellite positioning techniques described herein and as reported in the BSMs and/or SDSMs transmitted from the second vehicle 1104. The area of interest 1106 may be determined based on the location of the second vehicle 1104 (e.g., contained in the BSM) and the objMaxPostionOffset information element (IE) 1006 contained in the host data 1004 of the SDSM transmitted by the second vehicle 1104. As depicted in the first diagram 1100, the relevancy distance 1102*a* does not intersect with the area of interest 1106. Thus, the OBU on the first vehicle 1102 may discard all of the detected object data 1008 in the SDSM.

In a second diagram 1150 in FIG. 11B, the relative distance between the first and second vehicles is decreased such that there is an overlap between the relevancy distance 1102*a* and the area of interest 1106. In this example, the OBU in the first vehicle may detect the overlap based on the locations of the vehicles 1102, 1104 and the respective relevancy distance 1102*a* (applied to the location of the first vehicle 1102), and the objMaxPostionOffset information element (IE) 1006 contained in the host data 1004 of the SDSM transmitted by the second vehicle 1104. The OBU in the first vehicle may then decode the detected object data 1008 including object information for all the objects detected by the second vehicle 1104 (i.e., the third vehicle 1108 and the fourth vehicle 1110).

Figure 12:
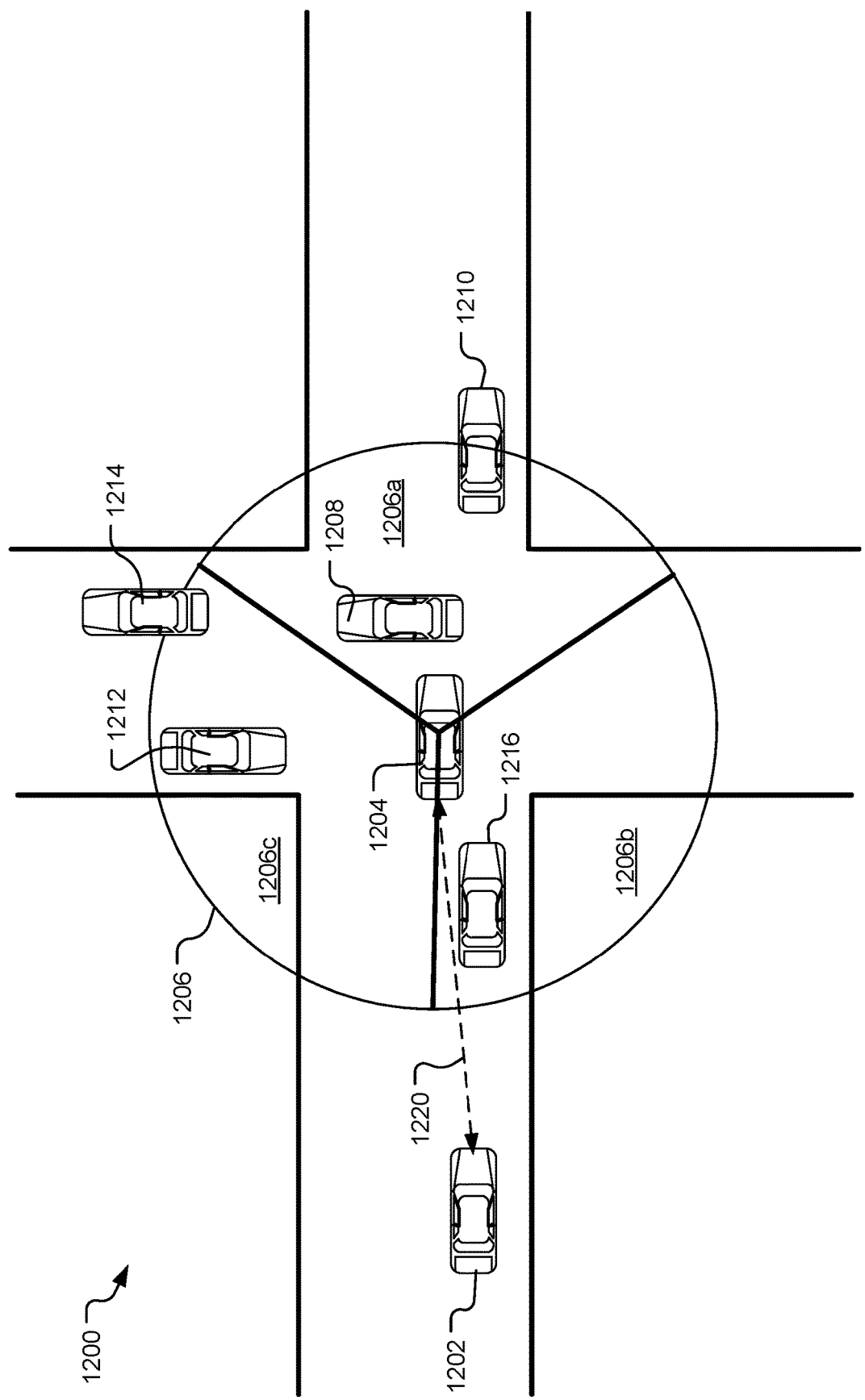
FIG. 12 is a diagram of an example group based object detection scheme.

Referring to FIG. 12, a diagram 1200 of an example group based object detection scheme is shown. The diagram 1200 includes two example V2X capable vehicles such as a first vehicle 1202 and a second vehicle 1204 configured to send and receive messages via a communication link 1220. The second vehicle 1204 includes onboard sensors configured to detect proximate objects such as the plurality of vehicles depicted in FIG. 8. The second vehicle 1204 may configure an area of interest 1206 utilizing the objMaxPostionOffset information element (IE) 1006. The host data 1004 may include additional IEs to define sub-areas of interest which may be used for grouping the detected objects within the area of interest 1206. For example, the area of interest 1206 may include a first sub-area 1206*a*, a second sub-area 1206*b*, and a third sub-area 1206*c*. The number and orientations of the sub-areas 1206*a-c* are examples, and not limitations, as other numbers and dispositions of sub-areas may be used.

In operation, in an example, the sub-area configurations may be used to enable partial filtering of irrelevant reported objects within an SDSM and the OBU may be configured to utilize the host data to decode the object instances of relevant detected objects. For example, referring to the example host data 1300 in FIG. 13, the objMaxPostionOffset IE 1006 may be used to define the area of interest 1206 and additional IEs 1304 may be used to define the sub-area and/or sub-groups of the object instances. In an example, a objGroupEndIndex IE may be used to organize the detected objects in different groups and indicate the starting index of detected objects in each group. The detected objects in relevant groups will be decoded by the receiver in the OBU and the objects in the non-relevant groups will be discarded (e.g., ignored, not decoded). The sub-areas 1206*a-c* may define three groups based on the heading of the second vehicle 1204, which may be included as one or more heading information elements 1302 in the host data 1300. For example, the first sub-area 1206*a* may define a first group including objects detected between −60 to +60 degrees from the heading of the second vehicle 1204. The second sub-area 1206*b* may define a second group including objects detected between +60 and 180 degrees, and the third sub-area 1206*c* may define a third group including objects detected between 180 and −60 degrees, as depicted in FIG. 12. Other sub-areas and groups may also be defined. For example, a two group area of interest including a forward area (e.g., −90 to +90 degrees) and an behind area (e.g., +90 to −90 degrees) may be defined.

The SDSM may be generated such that the detected object instances are sequenced and indexed based on the sub-areas/detected object groups. In an example, referring to the objGroupEndIndex IE, an array of index values (e.g., [5, 10, 30]) may be used to identify the different sub-areas. The first sub-area 1206*a* may include detected object information in instance indexes 0-5, the second sub-area 1206*b* may utilize detected object information in instance indexes 5-10, and the third sub-area 1206*c* may utilize detected object information in instance indexes 10-30. Other indexing schemes may also be used to create additional, or fewer, groupings. The receiver in the OBU on the first vehicle 1202 (e.g., the receiving vehicle) may be configured to decode the object detection instances based on the index values corresponding to the areas determined to be relevant to the first vehicle 1202 (e.g., based on the locations and/or trajectories of the first and second vehicles 1202, 1204, geometry of the roadway, and other factors which may increase or decrease the ability to safely operate a vehicle amongst one or more detected objects). In an example, referring to FIG. 12, the objects detected in the second sub-area 1206*b*, including a seventh vehicle 1216, and the third sub-area 1206*c*, including a fifth vehicle 1212 and a sixth vehicle 1214, may be relevant to the first vehicle 1202 approaching the intersection (e.g., because the coverage areas second and third sub-areas 1206*b*, 1206*c* are directed towards a crossing street which may include incoming vehicles). The receiver in the OBU on the first vehicle 1202 may utilize the index information associated with the second and third sub-areas 1206*b*, 1206*c* to decode the object instances in the object data associated with the fifth, sixth and seventh vehicles 1212, 1214, 1216. A third vehicle 1208 and a fourth vehicle 1210 are located in the first sub-area 1206*a* and the associated data is included in the detected object data 1008 in the SDSM transmitted by the second vehicle 1204. In an example, the first vehicle 1202 will not decode (e.g., discard) the object instances associated with the third and fourth vehicles 1208, 1210. The other vehicles in the diagram 1200 may also be configured to transmit BSMs and SDSMs to one another, and the receiving vehicles may be perform the partial filtering based on the sub-areas/groups defined in the host data of the respective SDSM messages.

In an example, additional fields may be included in the host data 1300 to provide more granular filtering of the object instances. For example, the additional IEs 1304 may include an objMaxPosOffsetInGroup IE may include an index array to identify detected objects which are within a maximum position offset for a sub-area/group. An objMinHeadingInGroup IE and an objMaxHeadingInGroup IE may include an index array to identify detected objects which are heading towards or away from the detection station (e.g., 0 degrees is heading toward, 180 degrees is heading away). For example, a group including the fourth vehicle 1210 and the sixth vehicle 1214 may be created because they are heading away from the second vehicle 1204 (i.e., the reporting vehicle). Other information elements may also be included in the host data 1300 to enable a receiver to partially filter the object instances in the detected object data 1008, such that the receiver will decode or discard the object instances based on the index values in the host data 1300.

Figure 14:
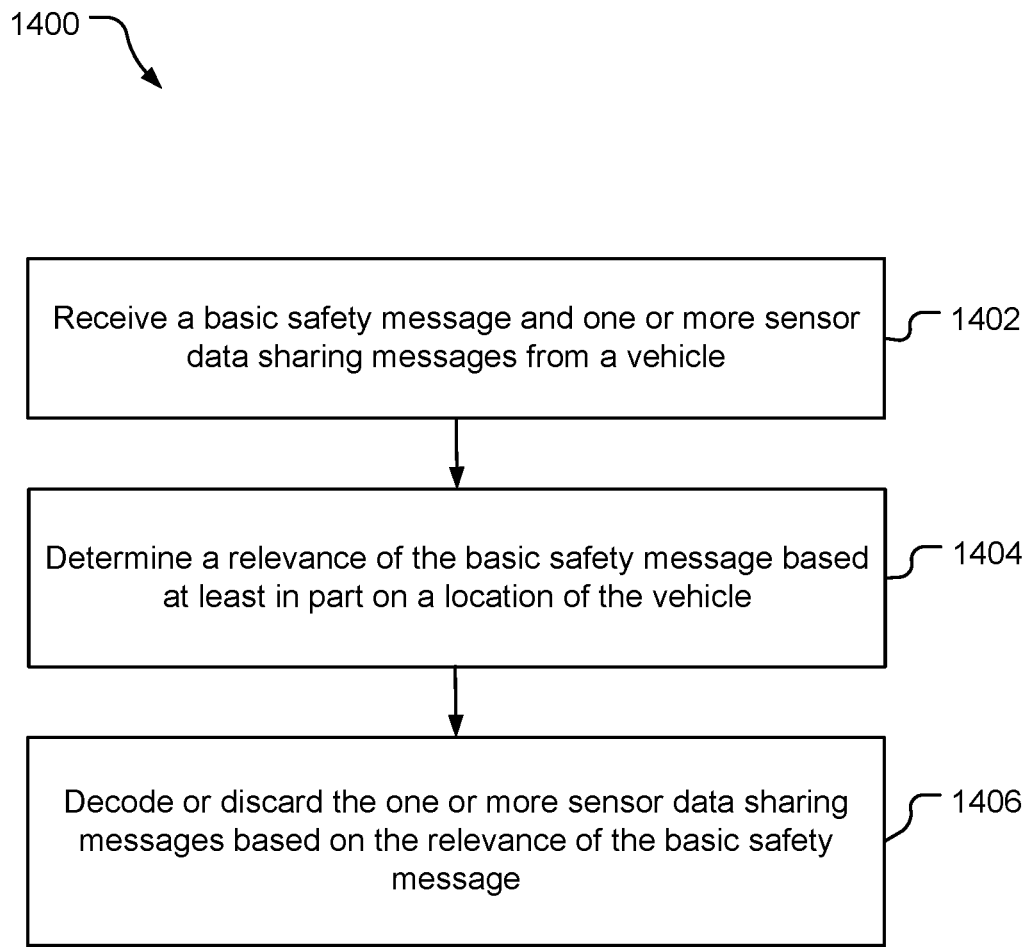
FIG. 14 is a process flow message of an example method for filtering SDSMs based on an association with a BSM.

Referring to FIG. 14, with further reference to FIGS. 1-13, a method 1400 for filtering SDSMs based on an association with a BSM includes the stages shown. The method 1400 is, however, an example and not limiting. The method 1400 may be altered, e.g., by having stages added, removed, rearranged, combined, performed concurrently, and/or having single stages split into multiple stages. The method 1400 may be performed by an OBU in a vehicle or other network resource such as a RSU, and/or a MEC server.

At stage 1402, the method includes receiving a basic safety message and one or more sensor data sharing messages from a vehicle. An OBU such as a UE 200, including processors 210 and a transceiver 215 is a means for receiving a BSM and one or more SDSMs. In an example, referring to FIG. 9A, the OBU on the first V2X configured vehicle 902 is configured to receive safety and sensor data messages via a communication link such as V2X or other ITS networking and transport layer 710. The BSMs may include a temporary ID value associated with a transmitting vehicle, and other information elements such as the current location (e.g., latitude, longitude, elevation, position accuracy), and other state information associated with the transmitting vehicle (e.g., TransmissionAndSpeed, Heading, BrakeSystemStatus, etc.). The second V2X configured vehicle 904 may be configured to transmit BSMs on a periodic basis, or in response to a query message provided by the first vehicle 902 or another station (e.g., RSU). The second vehicle 904 may also transmit object detection data such as a SDSM. For example, the SDSM may include a temporary ID value associated with the transmitting vehicle, and detected vehicle data based on a detected vehicle, such as the non-V2X vehicle 906. The OBU on the first vehicle 902 is configure to receive the BSM and SDSM transmitted by the second vehicle 904.

At stage 1404, the method includes determining a relevance of the basic safety message based at least in part on the location of the vehicle. The OBU, including processors 210, is a means for determining the relevance of the BSM. The BSM will include information elements based on the current location of the second vehicle 904. The OBU may be configured to determine the relevance of the BSM based on the risk of collision with the second vehicle 904. The OBU may be configured to utilize factors such as the positions and trajectories of the vehicles, geometry of the environment (e.g., map data), road conditions, environmental conditions (e.g., day, night, rain, snow, fog, etc.), and vehicle performance factors (e.g., stopping distance) to determine the relevance of a BSM received from a vehicle.

At stage 1406, the method includes decoding or discarding the one or more sensor data sharing messages based on the relevance of the basic safety message. The OBU, including processors 210, is a means for decoding or discarding the one or more SDSMs. In an example, the OBU on the first vehicle 902 may be configured to associate a BSM and SDSM transmitted from the second vehicle 904 based on the information contained in the messages. For example, the association may be based on a TempID contained the BSM and SDSM. If the remote vehicle uses the same TempID for the transmitted BSM and SDSM, then the SDSM may be filtered post verification. The association of the BSM and SDSM may be based on security certificate values if both messages are signed with the same certificate. For example, if each of the messages contains the hash of the other message's signing certificate. Once the SDSM has been associated with the BSM, a decision to decode or discard the SDSM may be based on the relevance of the BSM. Thus, if the BSM is relevant based on the analysis at stage 1404, then the SDSM is decoded. Conversely, if the BSM is determined to be non-relevant, then the SDSM is discarded (e.g., not decoded).

Figure 15:
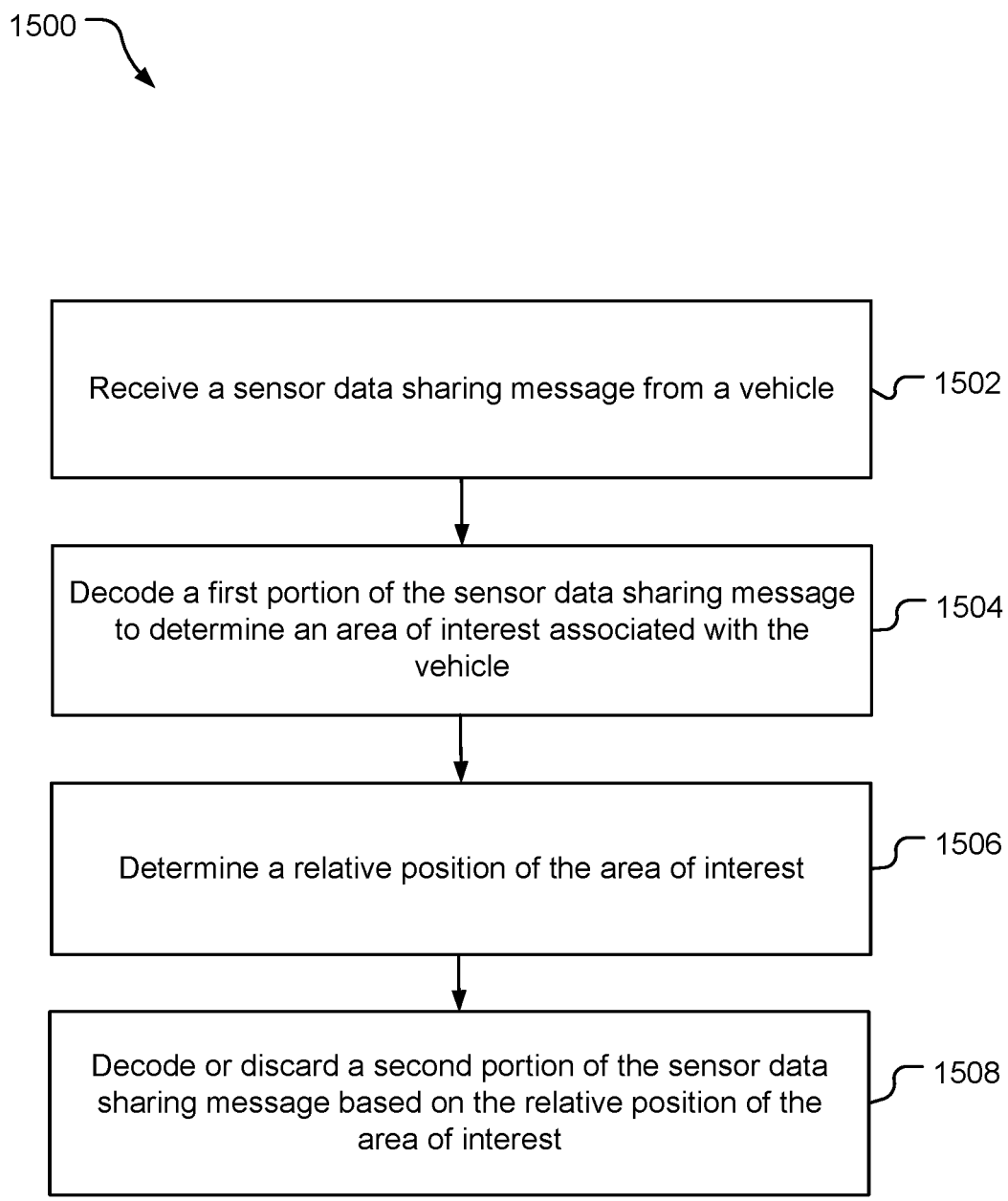
FIG. 15 is a process flow of an example method for partially filtering a SDSM.

Referring to FIG. 15, with further reference to FIGS. 1-13, a method 1500 for partially filtering a SDSM includes the stages shown. The method 1500 is, however, an example and not limiting. The method 1500 may be altered, e.g., by having stages added, removed, rearranged, combined, performed concurrently, and/or having single stages split into multiple stages. The method 1500 may be performed by an OBU in a vehicle or other network resource such as a RSU, and/or a MEC server.

At stage 1502, the method includes receiving a sensor data sharing message from a vehicle. An OBU such as a UE 200, including processors 210 and a transceiver 215 is a means for receiving a SDSM. In an example, referring to FIGS. 11A and 11B, the OBU on the first V2X configured vehicle 1102 is configured to receive safety and/or sensor data messages via a communication link 1112 such as V2X or other ITS networking and transport layer 710. The second vehicle 1104 may include onboard sensors for detecting proximate objects and may transmit object detection information via the communication link 1112. In an example, the object detection information may be included in a SDSM. For example, the SDSM may include current location information for the transmitting vehicle, and detected vehicle data based on detected vehicles, such as the third and fourth vehicles 1108, 1110. The OBU on the first vehicle 1102 is configure to receive the SDSM transmitted by the second vehicle 1104.

At stage 1504, the method includes decoding a first portion of the sensor data sharing message to determine an area of interest associated with the vehicle. The OBU, including processors 210 and a transceiver 215 is a means for decoding the first portion of the SDSM. In an example, referring to FIG. 10, the SDSM may include a first portion comprising host data 1004 and a second portion including detected object data 1008. The OBE in the first vehicle 1102 may be configured to decode the host data 1004 and determine a value for the objMaxPosOffset information element 1006. The objMaxPosOffset value may define a radius extending from the location of the second vehicle 1104. In an example, the area of interest associated with the second vehicle 1104 may be defined as a circle with a radius of the objMaxPosOffset around the second vehicle. Other parameters and geometric shapes or functions may also be used to define the area of interest. The host data 1004 may include other information elements to define an area or volume of space around the current location (e.g., refPos) of the transmitting vehicle (e.g., the additional IEs 1304). For example, referring to FIGS. 12 and 13, the area of interest may include sub-areas and object parameters to define groups of detected objects and the host data 1004 may include index information to enable the receiving OBU to decode object instances in the detected object data 1008 based on the relevancy of the sub-areas.

At stage 1506, the method includes determining a relative position of the area of interest. The OBU, including processors 210 and a transceiver 215 is a means for determining a relative position of the area of interest. The relative position of the area of interest may be based on the relative distances between the transmitting and receiving vehicles. In an example, the locations of the transmitting and receiving vehicles may be based on the terrestrial and/or satellite positioning techniques described herein and as reported in the BSMs and/or SDSMs transmitted from the vehicle. In an example, referring to FIGS. 11A and 11B, the receiving vehicle may have a relevancy distance 1102a to define a distance in front of the receiving vehicle for filtering object detection data. The relevancy distance 1102a may be a user setting, or may be based on the capabilities of the receiving vehicle, geometry of the roadway, vehicle state (e.g., speed, incline, decline), road conditions, or other driver and/or environmental factors (e.g., day, night, visibility, driver fatigue, etc.).

At stage 1508, the method includes decoding or discarding a second portion of the sensor data sharing message based on the relative position of the area of interest. The OBU, including processors 210 and a transceiver 215 is a means for decoding or discarding the second portion of the SDSM. The second portion of the SDSM includes the detected object data 1008 comprising object instances for detected objects (e.g., vehicles, VRUs, obstacles, etc.). In an example, the receiving OBU may be configured to decode or discard one or more of the object instances in the detected object data 1008 based on the relevance of the area of interest, and/or one or more sub-areas of interest. In an example, referring to FIG. 11B, the receiving OBU may be configured to decode all of the object instances in the detected object data 1008 if the relevancy distance 1102a of the receiving vehicle extends into the area of interest associated with the transmitting vehicle. In other examples, referring to FIGS. 12 and 13, the receiving OBU may be configured to decode or discard a subset of the object instances in the detected object data 1008 based on the relevancy (i.e., relevant position) of the sub-areas defined in the host data 1300. The partial filtering of the object instances based on the sub-area group indexing provides the technical advantage of reducing processing power and latency associated with decoding every object instance included in a SDSM.

Figure 16:
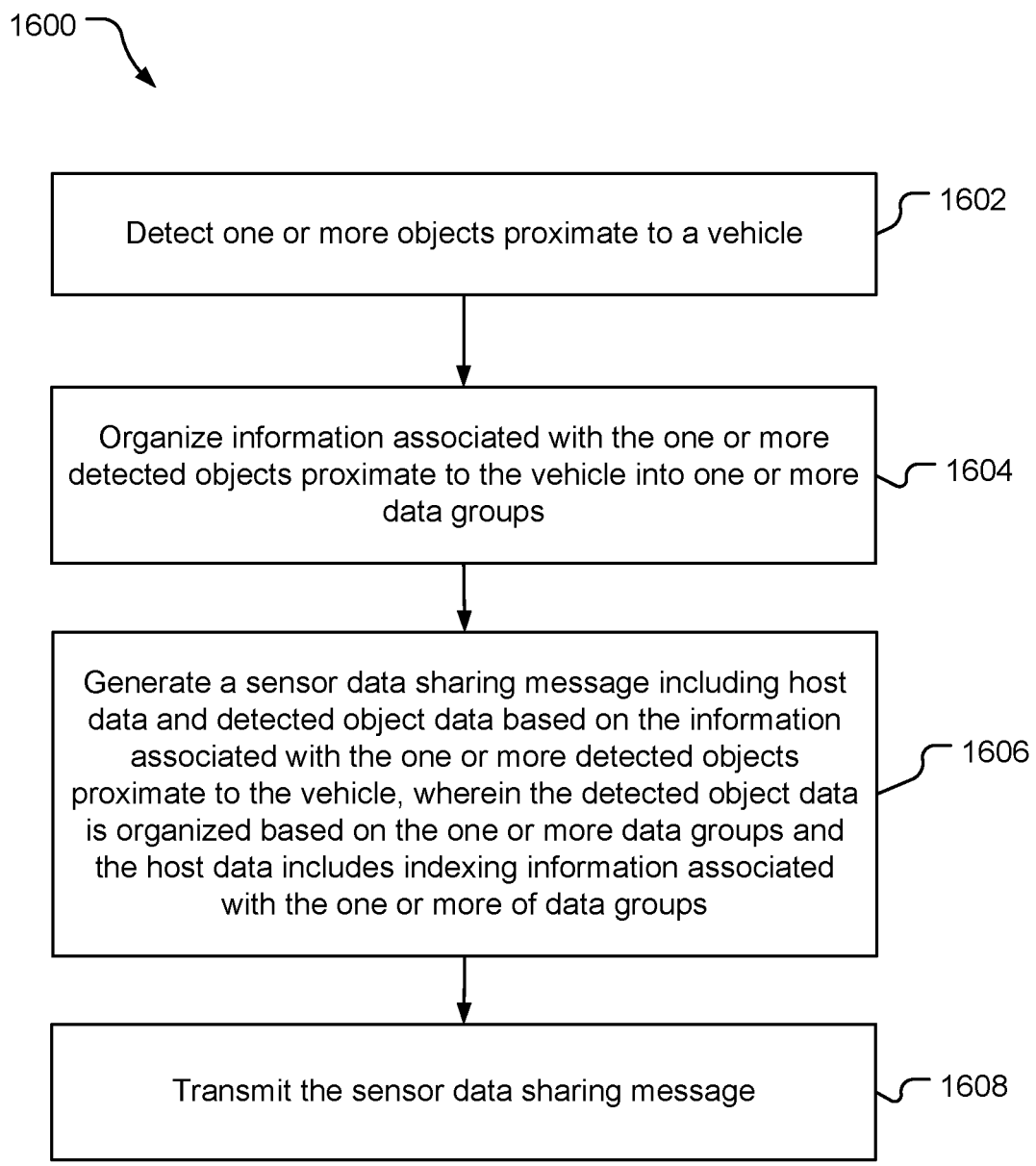
FIG. 16 is a process flow of an example method for providing detected object data.

Referring to FIG. 16, with further reference to FIGS. 1-13, a method 1600 for a providing detected object data includes the stages shown. The method 1600 is, however, an example and not limiting. The method 1600 may be altered, e.g., by having stages added, removed, rearranged, combined, performed concurrently, and/or having single stages split into multiple stages. The method 1600 may be performed by an OBU based on sensor data obtained by a vehicle, or by other network resources such as a RSU, and/or a MEC server based on sensor data obtained via a network.

At stage 1602, the method includes detecting one or more objects proximate to a vehicle. A OBU, such as a UE 200, including processors 210 and a transceiver 215 is a means for detecting one or more objects. The OBU may include one or more cameras 218, sensors 213 and wireless transceivers 240 to perform object detection. For example, a sensor processor 234 may comprise processors for radar, lidar, optical sensing, and other RF signaling to detect proximate objects and stations. In an example, the vehicle may utilize RF signaling to determine a range and bearing to a neighboring station (e.g., RTT and AoA measurements). Non-vehicle stations, such as RSU or a MEC server may be configured to detect objects based on networked sensors such as cameras, hall effect sensors, radar, lidar, sonic measurements, and other RF sensing and object detection techniques as known in the art.

At stage 1604, the method includes organizing information associated with the one or more detected objects proximate to the vehicle into one or more data groups. The OBU, including processors 210 is a means for organizing the one or more detected objects into one or more data groups. In an example, referring to FIGS. 11A and 11B, the data group may be based on an area of interest 1106 such that a receiving station may be configured to decode object instances in the SDSM that are associated with the objects detected within the area of interest 1106. In an example, referring to FIGS. 12 and 13, the one or more data groups may be based on sub-areas 1206a-c and/or additional criteria such as defined by the additional IEs 1304.

At stage 1606, the method includes generating a sensor data sharing message including host data and detected object data based on the information associated with the one or more objects proximate to the vehicle, wherein the detected object data is organized based on the one or more data groups and the host data includes indexing information associated with the one or more data groups. The OBU, including processors 210 is a means for generating the SDSM. The SDSM may include a first portion comprising host data 1300 and a second portion comprising detected object data 1008. The OBU may be configured to organize the object instances in the detected object data 1008 by index groups and then include an array of the index groups as parameters in the host data 1300. For example, referring to the objGroupEndIndex IE in the host data 1300, the array of index values (e.g., [5, 10, 30]) may be used to identify the different data groups (e.g., sub-areas). The first data group may include detected object information in instance indexes 0-5, the second data group may utilize detected object information in instance indexes 5-10, and the third data group may utilize detected object information in instance indexes 10-30. Other indexing schemes may also be used to create additional, or fewer, data groups. For example, the objMaxPosOffsetInGroup, the objMinHeadingInGroup, and the objMaxHeadingInGroup IEs may include index values 40 to enable the receiving vehicle to decode only the relevant object instances.

At stage 1608, the method includes transmitting the sensor data sharing message. The OBU, including the processors 210 and the transceiver 215, is a means for transmitting the SDSM. The SDSM may include object instances based on the one or more objects detected at stage 1602, and host data 1300 generated at stage 1606. The SDSM may be transmitted periodically or based on a request from a neighboring station. The SDSM may be transmitted via a communication link such as V2X, or other ITS networking and transport layer 710.

Figure 17:
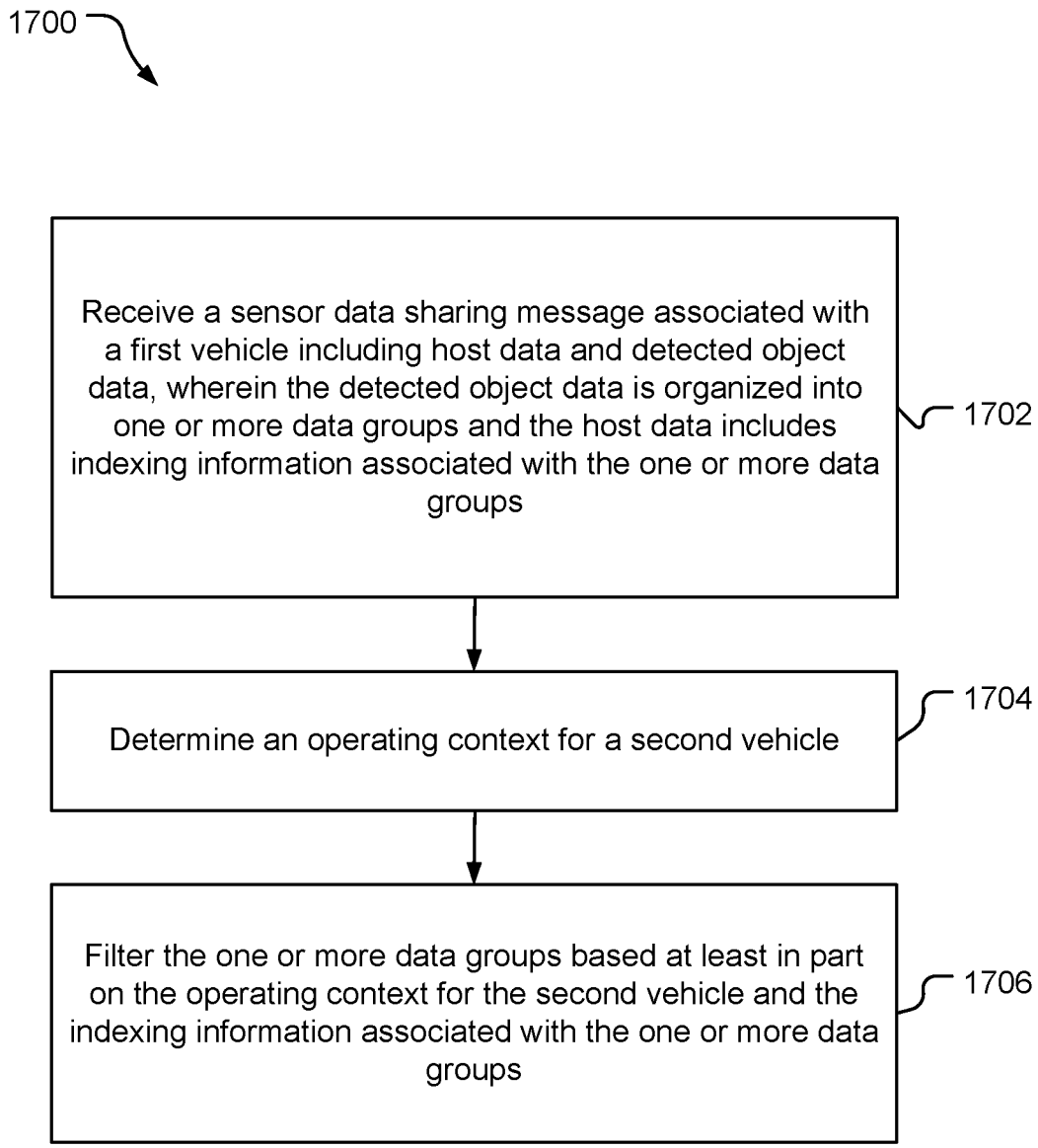
FIG. 17 is a process flow of an example method for filtering a portion of detected object data based on data groups.

Referring to FIG. 17, with further reference to FIGS. 1-13, a method 1700 for filtering a portion of detected object data based on data groups includes the stages shown. The method 1700 is, however, an example and not limiting. The method 1700 may be altered, e.g., by having stages added, removed, rearranged, combined, performed concurrently, and/or having single stages split into multiple stages. The method 1700 may be performed by an OBU in a vehicle or other network resource such as a RSU, and/or a MEC server.

At stage 1702, the method includes receiving a sensor data sharing message associated with a first vehicle including host data and detected object data, wherein the detected object data is organized into one or more data groups and the host data includes indexing information associated with the one or more data groups. A OBU, such as a UE 200, including processors 210 and a transceiver 215 is a means for receiving a SDSM. The SDSM may be transmitted from the first vehicle (or other stations such as a RSU) via a communication link such as V2X, or other ITS networking and transport layer 710. Referring to FIGS. 10 and 13, the SDSM may include a first portion comprising host data 1300 and a second portion comprising detected object data 1008. The object instances in the detected object data 1008 may be organized by index groups and the host data 1300 may include an array of the index groups as IE parameters. For example, referring to the objGroupEndIndex IE in the host data 1300, the array of index values (e.g., [5, 10, 30]) may be used to identify the different data groups (e.g., sub-areas). The first data group may include detected object information in instance indexes the second data group may utilize detected object information in instance indexes and the third data group may utilize detected object information in instance indexes 10-30. Other indexing schemes may also be used to create additional, or fewer, data groups. For example, the objMaxPosOffsetInGroup, the objMinHeadingInGroup, and the objMaxHeadingInGroup IEs may include index values to enable a receiving vehicle to decode only the relevant object instances.

At stage 1704, the method includes determining an operating context for a second vehicle. The OBU, including processors 210 and sensors 213, is a means for determining an operating context. The operating context may be based on vehicle and environmental factors to enable the second vehicle to determine whether detected object data is relevant to the second vehicle. For example, the operating context may be based on factors such as the positions and trajectories of the first and second vehicles, geometry of the environment (e.g., map data), road and traffic conditions, environmental conditions (e.g., day, night, rain, snow, fog, etc.), and performance factors associated with the second vehicle (e.g., stopping distance). Other parameters associated with the operation of a vehicle may be used as factors for determining the operating context for the second vehicle.

At stage 1706, the method includes filtering the one or more data groups based at least in part on the operating context for the second vehicle and the indexing information associated with the one or more data groups. The OBU, including processors 210, is a means for filtering the plurality of data groups. Filtering the plurality of data groups may be based on the contextual relevance of the locations of the first and second vehicles and the locations and/or states of the detected object data groups. In general, the filtering enables the second vehicle to decode objects that are in the data groups which represent a safety risk, or discard objects in the data groups which do not present a safety risk. In an example, referring to FIG. 12, the objects detected in the second sub-area 1206b, including the seventh vehicle 1216, and the third sub-area 1206c, including the fifth vehicle 1212 and the sixth vehicle 1214, may be relevant to the first vehicle 1202 approaching the intersection. The receiver in the OBU on the first vehicle 1202 may utilize the index information associated with the second and third sub-areas 1206b, 1206c to decode the object instances in the object data associated with the fifth, sixth and seventh vehicles 1212, 1214, 1216. The third vehicle 1208 and the fourth vehicle 1210 are located in the first sub-area 1206a and the associated data is included in the detected object data 1008 in the SDSM transmitted by the second vehicle 1204. In an example, the first vehicle 1202 will not decode (e.g., discard) the object instances associated with the third and fourth vehicles 1208, 1210. The other vehicles in the diagram 1200 may also be configured to transmit BSMs and SDSMs to one another, and the receiving vehicles may be perform the partial filtering based on the sub-areas/groups defined in the host data of the respective SDSM messages. Other indexing schemes may also be used to create additional, or fewer, data groups. For example, the objMaxPosOffsetInGroup, the objMinHeadingInGroup, and the objMaxHeadingInGroup IEs may include index values to enable the second vehicle to decode only the relevant object instances. For example, since the fourth vehicle 1210 and the sixth vehicle 1214 are heading away from the intersection, their object instances may be indexed such that the OBU in the second vehicle 1204 will not decode them based on the objMinHeadingInGroup array.

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

As used herein, unless otherwise stated, a statement that a function or operation is "based on" an item or condition means that the function or operation is based on the stated item or condition and may be based on one or more items and/or conditions in addition to the stated item or condition.

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed. Components, functional or otherwise, shown in the figures and/or discussed herein as being connected or communicating with each other are communicatively coupled unless otherwise noted. That is, they may be directly or indirectly connected to enable communication between them.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or even primarily, for communication, or that communication using the wireless communication device is exclusively, or even primarily, wireless, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations, and does not limit the scope, applicability, or configurations of the claims. Rather, the preceding description of the configurations provides a description for implementing described techniques. Various changes may be made in the function and arrangement of elements.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used. For example, the above elements may be components of a larger system, wherein other rules may take precedence over or otherwise modify the application of the disclosure. Also, a number of operations may be undertaken before, during, or after the above elements are considered. Accordingly, the above description does not bound the scope of the claims.

Unless otherwise indicated, "about" and/or "approximately" as used herein when referring to a measurable value such as an amount, a temporal duration, and the like, encompasses variations of ±20% or ±10%, ±5%, or +0.1% from the specified value, as appropriate in the context of the systems, devices, circuits, methods, and other implementations described herein. Unless otherwise indicated, "substantially" as used herein when referring to a measurable value such as an amount, a temporal duration, a physical attribute (such as frequency), and the like, also encompasses variations of ±20% or ±10%, ±5%, or +0.1% from the specified value, as appropriate in the context of the systems, devices, circuits, methods, and other implementations described herein.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

Implementation examples are described in the following numbered clauses:

Clause 1. A method for providing detected object data, comprising: detecting one or more objects proximate to a vehicle; organizing information associated with the one or more detected objects proximate to the vehicle into one or more data groups; generating a sensor data sharing message including host data and detected object data based on the information associated with the one or more detected objects proximate to the vehicle, wherein the detected object data is organized based on the one or more data groups and the host data includes indexing information associated with the one or more data groups; and transmitting the sensor data sharing message.

Clause 2. The method of clause 1 wherein the one or more data groups defines an area around the vehicle.

Clause 3. The method of clause 2 wherein the area is a circle around the vehicle, and the host data includes a first information element to define a radius of the circle.

Clause 4. The method of clause 1 wherein the one or more data groups define a plurality of areas proximate to the vehicle.

Clause 5. The method of clause 4 wherein the host data includes a second information element including an array of index values associated with position offsets for each of the plurality of areas proximate to the vehicle.

Clause 6. The method of clause 1 wherein the one or more data groups are associated with a heading of each of the one or more detected objects.

Clause 7. The method of clause 1 further comprising transmitting a basic safety message including a current location of the vehicle, wherein the sensor data sharing message is associated with the basic safety message.

Clause 8. The method of clause 7 wherein the basic safety message and the sensor data sharing message each include an identification information element containing the same identification value.

Clause 9. The method of clause 1 wherein detecting the one or more objects proximate to the vehicle is based on signals obtained by a radar sensor, a lidar sensor, an optical sensor, radio frequency communication systems, or combinations thereof.

Clause 10. A method for filtering detected object data, comprising: receiving a sensor data sharing message associated with a first vehicle including host data and detected object data, wherein the detected object data is organized into one or more data groups and the host data includes indexing information associated with the one or more data groups; determining an operating context for a second vehicle; and filtering the one or more data groups based at least in part on the operating context for the second vehicle and the indexing information associated with the one or more data groups.

Clause 11. The method of clause 10 wherein the one or more data groups defines an area around the first vehicle.

Clause 12. The method of clause 11 wherein the area is a circle around the first vehicle, and the host data includes a first information element to define a radius of the circle.

Clause 13. The method of clause 10 wherein the one or more data groups define a plurality of areas proximate to the first vehicle.

Clause 14. The method of clause 13 wherein the host data includes a second information including an array of index values associated with position offsets for each of the plurality of areas proximate to the first vehicle.

Clause 15. The method of clause 10 wherein the one or more data groups are associated with a heading of each of the one or more detected objects.

Clause 16. The method of clause 10 further comprising receiving a basic safety message including a current location of the first vehicle, wherein the sensor data sharing message is associated with the basic safety message.

Clause 17. The method of clause 16 wherein the basic safety message and the sensor data sharing message each include an identification information element containing the same identification value.

Clause 18. The method of clause 10 wherein determining the operating context for the second vehicle includes determining current positions for the first vehicle and the second vehicle, determining trajectories for the first vehicle and the second vehicle, determining a geometry of an environment proximate to the second vehicle, or combinations thereof.

Clause 19. The method of clause 10 wherein determining the operating context for the second vehicle includes determining a current environmental condition, determining current road conditions, determining performance factors associated with the second vehicle, or combinations thereof.

Clause 20. The method of clause 10 wherein filtering the one or more data groups includes decoding the one or more data groups that are relevant to the second vehicle, or discarding the one or more data groups that are not relevant to the second vehicle.

Clause 21. An apparatus, comprising: a memory; at least one transceiver; at least one processor communicatively coupled to the memory and the at least one transceiver, and configured to: detect one or more objects proximate to a vehicle; organize information associated with the one or more detected objects proximate to the vehicle into one or more data groups; generate a sensor data sharing message including host data and detected object data based on the information associated with the one or more detected objects proximate to the vehicle, wherein the detected object data is organized based on the one or more data groups and the host data includes indexing information associated with the one or more data groups; and transmit the sensor data sharing message.

Clause 22. The apparatus of clause 21 wherein the one or more data groups defines an area around the vehicle.

Clause 23. The apparatus of clause 22 wherein the area is a circle around the vehicle, and the host data includes a first information element to define a radius of the circle.

Clause 24. The apparatus of clause 21 wherein the one or more data groups define a plurality of areas proximate to the vehicle.

Clause 25. The apparatus of clause 24 wherein the host data includes a second information element including an array of index values associated with position offsets for each of the plurality of areas proximate to the vehicle.

Clause 26. The apparatus of clause 21 wherein the one or more data groups are associated with a heading of each of the one or more detected objects.

Clause 27. The apparatus of clause 21 wherein the at least one processor is further configured to transmit a basic safety message including a current location of the vehicle, wherein the sensor data sharing message is associated with the basic safety message.

Clause 28. The apparatus of clause 27 wherein the basic safety message and the sensor data sharing message each include an identification information element containing the same identification value.

Clause 29. The apparatus of clause 21 wherein the at least one processor is further configured to detect the one or more objects proximate to the vehicle is based on signals obtained by a radar sensor, a lidar sensor, an optical sensor, radio frequency communication systems, or combinations thereof.

Clause 30. An apparatus, comprising: a memory; at least one transceiver; at least one processor communicatively coupled to the memory and the at least one transceiver, and configured to: receive a sensor data sharing message associated with a first vehicle including host data and detected object data, wherein the detected object data is organized into one or more data groups and the host data includes indexing information associated with the one or more data groups; determine an operating context for a second vehicle; and filter the one or more data groups based at least in part on the operating context for the second vehicle and the indexing information associated with the one or more data groups.

Clause 31. The apparatus of clause 30 wherein the one or more data groups defines an area around the first vehicle.

Clause 32. The apparatus of clause 31 wherein the area is a circle around the first vehicle, and the host data includes a first information element to define a radius of the circle.

Clause 33. The apparatus of clause 30 wherein the one or more data groups define a plurality of areas proximate to the first vehicle.

Clause 34. The apparatus of clause 33 wherein the host data includes a second information including an array of index values associated with position offsets for each of the plurality of areas proximate to the first vehicle.

Clause 35. The apparatus of clause 30 wherein the one or more data groups are associated with a heading of each of the one or more detected objects.

Clause 36. The apparatus of clause 30 wherein the at least one processor is further configured to receive a basic safety message including a current location of the first vehicle, wherein the sensor data sharing message is associated with the basic safety message.

Clause 37. The apparatus of clause 36 wherein the basic safety message and the sensor data sharing message each include an identification information element containing the same identification value.

Clause 38. The apparatus of clause 30 wherein the at least one processor is further configured to determine the operating context for the second vehicle based at least in part on current positions for the first vehicle and the second vehicle, trajectories for the first vehicle and the second vehicle, a geometry of an environment proximate to the second vehicle, or combinations thereof.

Clause 39. The apparatus of clause 30 wherein the at least one processor is further configured to determine the operating context for the second vehicle based at least in part on a current environmental condition, a current road condition, a performance factor associated with the second vehicle, or combinations thereof.

Clause 40. The apparatus of clause 30 wherein the at least one processor is further configured to decode the one or more data groups that are relevant to the second vehicle, or discard the one or more data groups that are not relevant to the second vehicle to filter the one or more data groups.

Clause 41. An apparatus for providing detected object data, comprising:
    means for detecting one or more objects proximate to a vehicle; means for organizing information associated with the one or more detected objects proximate to the vehicle into one or more data groups; means for generating a sensor data sharing message including host data and the detected object data based on the information associated with the one or more detected objects proximate to the vehicle, wherein the detected object data is organized based on the one or more data groups and the host data includes indexing information associated with the one or more data groups; and means for transmitting the sensor data sharing message.

Clause 42. An apparatus for filtering detected object data, comprising: means for receiving a sensor data sharing message associated with a first vehicle including host data and the detected object data, wherein the detected object data is organized into one or more data groups and the host data includes indexing information associated with the one or more data groups; means for determining an operating context for a second vehicle; and means for filtering the one or more data groups based at least in part on the operating context for the second vehicle and the indexing information associated with the one or more data groups.

Clause 43. A non-transitory processor-readable storage medium comprising processor-readable instructions configured to cause one or more processors to provide detected object data, comprising code for: detecting one or more objects proximate to a vehicle; organizing information associated with the one or more detected objects proximate to the vehicle into one or more data groups; generating a sensor data sharing message including host data and the detected object data based on the information associated with the one or more detected objects proximate to the vehicle, wherein the detected object data is organized based on the one or more data groups and the host data includes indexing information associated with the one or more data groups; and transmitting the sensor data sharing message.

Clause 44. A non-transitory processor-readable storage medium comprising processor-readable instructions configured to cause one or more processors to filter detected object data, comprising code for: receiving a sensor data sharing message associated with a first vehicle including host data and the detected object data, wherein the detected object data is organized into one or more data groups and the host data includes indexing information associated with the one or more data groups; determining an operating context for a second vehicle; and filtering the one or more data groups based at least in part on the operating context for the second vehicle and the indexing information associated with the one or more data groups.

Clause 45. A method for filtering detected object data, comprising: receiving a basic safety message and one or more sensor data sharing messages from a vehicle; determining a relevance of the basic safety message based at least in part on a location of the vehicle; and decoding or discarding the one or more sensor data sharing messages based on the relevance of the basic safety message.

Clause 46. The method of clause 45 wherein the basic safety message and the one or more sensor data sharing messages are received via an intelligent transportation systems networking and transportation layer.

Clause 47. The method of clause 45 wherein the basic safety message and the one or more sensor data sharing messages each include an identification information element containing the same identification value.

Clause 48. The method of clause 45 wherein the basic safety message and the one or more sensor data sharing messages are each signed with the same security certificate value.

Clause 49. The method of clause 45 wherein determining the relevance of the basic safety message is further based on a trajectory of the vehicle, a geometry of an environment proximate to the vehicle, environmental conditions, or combinations thereof.

Clause 50. A method for partially filtering a sensor data sharing message, comprising: receiving the sensor data sharing message from a vehicle; decoding a first portion of the sensor data sharing message to determine an area of interest associated with the vehicle; determining a relative position of the area of interest; and decoding or discarding a second portion of the sensor data sharing message based on the relative position of the area of interest.

Clause 51. The method of clause 50 wherein the area of interest is a circle around the vehicle, and the first portion of the sensor data sharing message includes an information element to define a radius of the circle.

Clause 52. The method of clause 51 wherein the area of interest comprises a plurality of sub-areas proximate to the vehicle.

Clause 53. The method of clause 52 wherein the first portion of the sensor data sharing message includes one or more information elements including an array of index values associated with position offsets for each of the plurality of sub-areas proximate to the vehicle.

Clause 54. The method of clause 53 wherein determining the relative position of the area of interest includes determining the relative position of the plurality of sub-areas proximate to the vehicle.

Clause 55. The method of clause 54 wherein determining the relative position of the plurality of sub-areas proximate to the vehicle is based on a heading of the vehicle.

Clause 56. The method of clause 50 wherein the first portion of the sensor data sharing message includes one or more information elements associated with a heading of one or more objects detected by the vehicle, and decoding or discarding the second portion of the sensor data sharing message is based at least in part on the heading of one or more objects detected by the vehicle.

Clause 57. The method of clause 50 further comprising receiving a basic safety message including a current location of the vehicle, wherein the sensor data sharing message is associated with the basic safety message.

Clause 58. The method of clause 57 wherein the basic safety message and the sensor data sharing message each include an identification information element containing the same identification value.

Clause 59. The method of clause 50 wherein the sensor data sharing message is received via an intelligent transportation systems networking and transportation layer.

Clause 60. An apparatus, comprising: a memory; at least one transceiver; at least one processor communicatively coupled to the memory and the at least one transceiver, and configured to: receive a basic safety message and one or more sensor data sharing messages from a vehicle; determine a relevance of the basic safety message based at least in part on a location of the vehicle; and decode or discard the one or more sensor data sharing messages based on the relevance of the basic safety message.

Clause 61. The apparatus of clause 60 wherein the basic safety message and the one or more sensor data sharing messages are received via an intelligent transportation systems networking and transportation layer.

Clause 62. The apparatus of clause 60 wherein the basic safety message and the one or more sensor data sharing messages each include an identification information element containing the same identification value.

Clause 63. The apparatus of clause 60 wherein the basic safety message and the one or more sensor data sharing messages are each signed with the same security certificate value.

Clause 64. The apparatus of clause 60 wherein the at least one processor is further configured to determine the relevance of the basic safety message based at least in part on a trajectory of the vehicle, a geometry of an environment proximate to the vehicle, an environmental condition, or combinations thereof.

Clause 65. An apparatus, comprising: a memory; at least one transceiver; at least one processor communicatively coupled to the memory and the at least one transceiver, and configured to: receive a sensor data sharing message from a vehicle; decode a first portion of the sensor data sharing message to determine an area of interest associated with the vehicle; determine a relative position of the area of interest; and decode or discard a second portion of the sensor data sharing message based on the relative position of the area of interest.

Clause 66. The apparatus of clause 65 wherein the area of interest is a circle around the vehicle, and the first portion of the sensor data sharing message includes an information element to define a radius of the circle.

Clause 67. The apparatus of clause 66 wherein the area of interest comprises a plurality of sub-areas proximate to the vehicle.

Clause 68. The apparatus of clause 67 wherein the first portion of the sensor data sharing message includes one or more information elements including an array of index values associated with position offsets for each of the plurality of sub-areas proximate to the vehicle.

Clause 69. The apparatus of clause 68 wherein the at least one processor is further configured to determine the relative position of the area of interest based at least in part on the relative position of the plurality of sub-areas proximate to the vehicle.

Clause 70. The apparatus of clause 69 wherein the at least one processor is further configured to determine the relative position of the plurality of sub-areas proximate to the vehicle based at least in part on a heading of the vehicle.

Clause 71. The apparatus of clause 65 wherein the first portion of the sensor data sharing message includes one or more information elements associated with a heading of one or more objects detected by the vehicle, and the at least one processor is further configured to decode or discard the second portion of the sensor data sharing message based at least in part on the heading of one or more objects detected by the vehicle.

Clause 72. The apparatus of clause 65 wherein the at least one processor is further configured to receive a basic safety message including a current location of the vehicle, wherein the sensor data sharing message is associated with the basic safety message.

Clause 73. The apparatus of clause 72 wherein the basic safety message and the sensor data sharing message each include an identification information element containing the same identification value.

Clause 74. The apparatus of clause 72 wherein the sensor data sharing message is received via an intelligent transportation systems networking and transportation layer.

Clause 75. An apparatus for filtering detected object data, comprising: means for receiving a basic safety message and one or more sensor data sharing messages from a vehicle; means for determining a relevance of the basic safety message based at least in part on a location of the vehicle; and means for decoding or discarding the one or more sensor data sharing messages based on the relevance of the basic safety message.

Clause 76. An apparatus for partially filtering a sensor data sharing message, comprising: means for receiving the sensor data sharing message from a vehicle; means for decoding a first portion of the sensor data sharing message to determine an area of interest associated with the vehicle; means for determining a relative position of the area of interest; and means for decoding or discarding a second portion of the sensor data sharing message based on the relative position of the area of interest.

Clause 77. A non-transitory processor-readable storage medium comprising processor-readable instructions configured to cause one or more processors to filter detected object data, comprising code for: receiving a basic safety message and one or more sensor data sharing messages from a vehicle; determining a relevance of the basic safety message based at least in part on a location of the vehicle; and decoding or discarding the one or more sensor data sharing messages based on the relevance of the basic safety message.

Clause 78. A non-transitory processor-readable storage medium comprising processor-readable instructions configured to cause one or more processors to partially filter a sensor data sharing message, comprising code for: receiving the sensor data sharing message from a vehicle; decoding a first portion of the sensor data sharing message to determine an area of interest associated with the vehicle; determining a relative position of the area of interest; and decoding or discarding a second portion of the sensor data sharing message based on the relative position of the area of interest.

The invention claimed is:

1. A method for partially filtering a sensor data sharing message, comprising:
receiving, at a first vehicle, the sensor data sharing message from a second vehicle that is distinct from the first vehicle;
decoding, at the first vehicle, a first portion of the sensor data sharing message to determine an area of interest associated with the second vehicle;
determining, at the first vehicle, a relative position of the area of interest; and
determining whether to decode a second portion of the sensor data sharing message based at least in part on the relative position of the area of interest, the second portion of the sensor data sharing message being a detected-object-data portion of the sensor data sharing message.

2. The method of claim 1 wherein the area of interest is a circle around the second vehicle, and the first portion of the sensor data sharing message includes an information element to define a radius of the circle.

3. The method of claim 2 wherein the area of interest comprises a plurality of sub-areas proximate to the second vehicle.

4. The method of claim 3 wherein the first portion of the sensor data sharing message includes one or more information elements including an array of index values associated with position offsets for each of the plurality of sub-areas proximate to the second vehicle.

5. The method of claim 4 wherein determining the relative position of the area of interest includes determining the relative position of the plurality of sub-areas proximate to the second vehicle.

6. The method of claim 5 wherein determining the relative position of the plurality of sub-areas proximate to the second vehicle is based at least in part on a heading of the second vehicle.

7. The method of claim 1 wherein the first portion of the sensor data sharing message includes one or more information elements associated with a heading of one or more objects detected by the second vehicle, and determining whether to decode the second portion of the sensor data sharing message is based at least in part on the heading of one or more objects detected by the second vehicle.

8. The method of claim 1 further comprising receiving, at the first vehicle from the second vehicle, a basic safety message including a current location of the second vehicle, wherein the sensor data sharing message is associated with the basic safety message.

9. The method of claim 8 wherein the basic safety message and the sensor data sharing message each include an identification information element containing the same identification value.

10. The method of claim 1 wherein the sensor data sharing message is received via an intelligent transportation systems networking and transportation layer.

11. An apparatus, comprising:
a memory;
at least one transceiver;
at least one processor communicatively coupled to the memory and the at least one transceiver, and configured to:

receive a sensor data sharing message from a vehicle;
decode a first portion of the sensor data sharing message to determine an area of interest associated with the vehicle;
determine a relative position of the area of interest; and
determine whether to decode a second portion of the sensor data sharing message based at least in part on the relative position of the area of interest, the second portion of the sensor data sharing message being a detected-object-data portion of the sensor data sharing message.

12. The apparatus of claim 11 wherein the area of interest is a circle around the vehicle, and the first portion of the sensor data sharing message includes an information element to define a radius of the circle.

13. The apparatus of claim 11 wherein the area of interest comprises a plurality of sub-areas proximate to the vehicle.

14. The apparatus of claim 13 wherein the first portion of the sensor data sharing message includes one or more information elements including an array of index values associated with position offsets for each of the plurality of sub-areas proximate to the vehicle.

15. The apparatus of claim 14 wherein the at least one processor is further configured to determine the relative position of the area of interest based at least in part on the relative position of the plurality of sub-areas proximate to the vehicle.

16. The apparatus of claim 15 wherein the at least one processor is further configured to determine the relative position of the plurality of sub-areas proximate to the vehicle based at least in part on a heading of the vehicle.

17. The apparatus of claim 11 wherein the first portion of the sensor data sharing message includes one or more information elements associated with a heading of one or more objects detected by the vehicle, and the at least one processor is further configured to determine whether to decode the second portion of the sensor data sharing message based at least in part on the heading of one or more objects detected by the vehicle.

18. The apparatus of claim 11 wherein the at least one processor is further configured to receive a basic safety message including a current location of the vehicle, wherein the sensor data sharing message is associated with the basic safety message.

19. The apparatus of claim 18 wherein the basic safety message and the sensor data sharing message each include an identification information element containing the same identification value.

20. The apparatus of claim 18 wherein the sensor data sharing message is received via an intelligent transportation systems networking and transportation layer.

* * * * *